United States Patent
Zhang et al.

(10) Patent No.: US 11,864,046 B2
(45) Date of Patent: Jan. 2, 2024

(54) NETWORK SELECTION METHOD AND APPARATUS APPLIED TO MOBILE TERMINAL

(71) Applicant: Huawei Technologies Co., Ltd., Shenzhen (CN)

(72) Inventors: Bao Zhang, Shanghai (CN); Weilin Gong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/275,279

(22) PCT Filed: Sep. 17, 2018

(86) PCT No.: PCT/CN2018/105981
§ 371 (c)(1),
(2) Date: Mar. 11, 2021

(87) PCT Pub. No.: WO2020/056548
PCT Pub. Date: Mar. 26, 2020

(65) Prior Publication Data
US 2021/0289412 A1   Sep. 16, 2021

(51) Int. Cl.
*H04W 4/00* (2018.01)
*H04W 36/20* (2009.01)
*H04W 8/18* (2009.01)
*H04W 36/08* (2009.01)
*H04W 48/18* (2009.01)

(52) U.S. Cl.
CPC ............. *H04W 36/20* (2013.01); *H04W 8/18* (2013.01); *H04W 36/08* (2013.01); *H04W 48/18* (2013.01)

(58) Field of Classification Search
CPC ....... H04W 36/20; H04W 8/18; H04W 36/08; H04W 48/18; H04W 48/20; H04W 8/183; H04W 88/06
USPC .................................. 370/331, 338; 455/312
See application file for complete search history.

(56) References Cited

U.S. PATENT DOCUMENTS

| | | | |
|---|---|---|---|
| 2013/0244660 A1 | 9/2013 | Kumar et al. | |
| 2013/0260761 A1 | 10/2013 | Walke et al. | |
| 2013/0303235 A1 | 11/2013 | Zheng | |
| 2013/0344872 A1 | 12/2013 | Nukala et al. | |
| 2014/0200046 A1 | 7/2014 | Sikri et al. | |
| 2014/0314008 A1 | 10/2014 | Lee et al. | |
| 2016/0050686 A1* | 2/2016 | Krishnamoorthi | H04W 28/04 455/418 |
| 2016/0205605 A1* | 7/2016 | Krishnamurthy | H04W 48/18 455/437 |

(Continued)

FOREIGN PATENT DOCUMENTS

| CN | 102123466 A | 7/2011 |
|---|---|---|
| CN | 102469542 A | 5/2012 |

(Continued)

*Primary Examiner* — Marcos Batista
(74) *Attorney, Agent, or Firm* — Conley Rose, P.C.

(57) ABSTRACT

A network selection method includes executing, by a mobile terminal, a communication service using a first identification card, determining, by the mobile terminal, that the communication service interferes with a second identification card in the mobile terminal, and adjusting, by the mobile terminal, cell reselection information of the second identification card to reselect to a non-interfered-with cell.

20 Claims, 9 Drawing Sheets

(56) References Cited

U.S. PATENT DOCUMENTS

2016/0249301 A1    8/2016   Xiao et al.
2016/0366626 A1   12/2016   Krishnamoorthy et al.

FOREIGN PATENT DOCUMENTS

| | | |
|---|---|---|
| CN | 103139891 A | 6/2013 |
| CN | 104221451 A | 12/2014 |
| CN | 104335634 A | 2/2015 |
| CN | 102752759 B | 9/2015 |
| CN | 104995989 A | 10/2015 |
| CN | 106454893 A | 2/2017 |
| CN | 107294641 A | 10/2017 |
| CN | 107332640 A | 11/2017 |
| CN | 104919711 B | 12/2017 |
| EP | 2466970 A1 | 6/2012 |

* cited by examiner

| China Unicom, China Telecom FDD B3 DL | China Mobile TDD B39 UL&DL | China Telecom, China Unicom FDD B1 UL |
|---|---|---|
| 1840        1880 | 1880        1920 | 1920        1980 |
FIG. 3
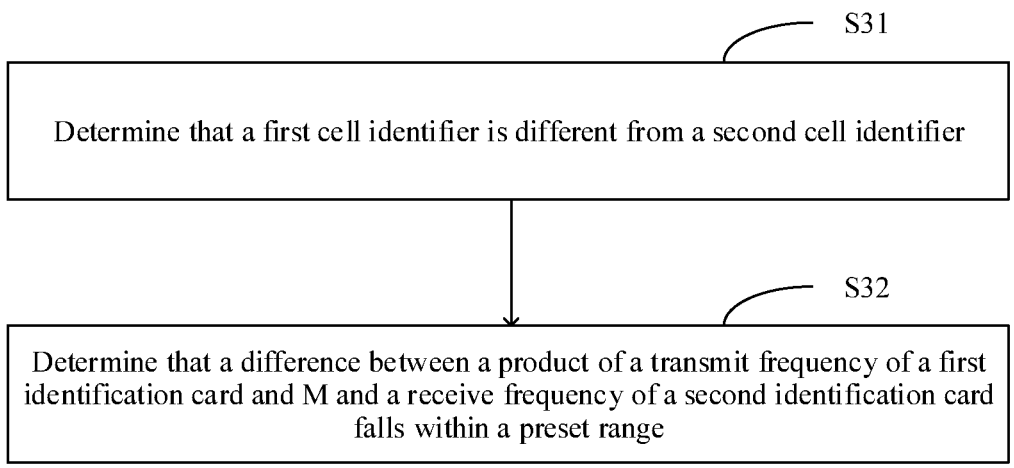
FIG. 4
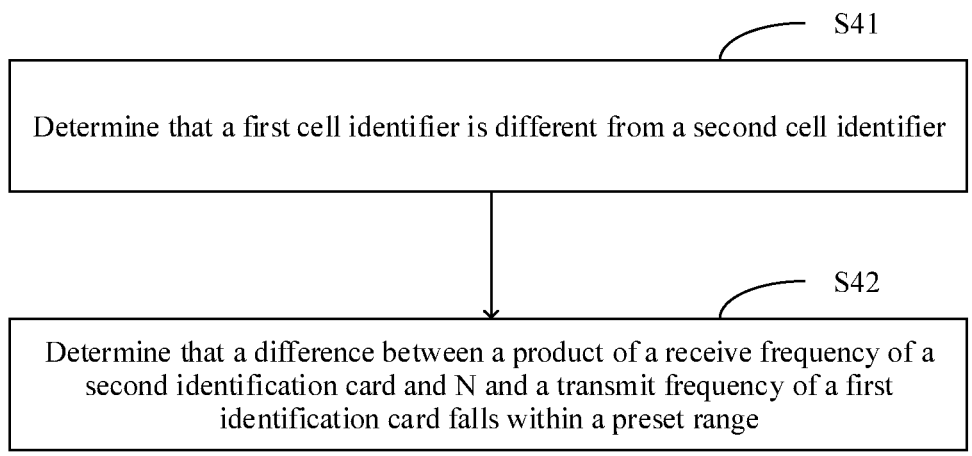
FIG. 5

NETWORK SELECTION METHOD AND APPARATUS APPLIED TO MOBILE TERMINAL

CROSS-REFERENCE TO RELATED APPLICATIONS

This application is a U.S. National Stage of International Patent Application No. PCT/CN2018/105981 filed on Sep. 17, 2018, which is hereby incorporated by reference in its entirety.

TECHNICAL FIELD

This application relates to the field of communications technologies, and in particular, to a network selection method and apparatus applied to a mobile terminal.

BACKGROUND

To meet diversified user requirements, currently, most mobile terminals can simultaneously support at least two standards of a second generation mobile communications (second generation mobile communication, 2G) standard, a third generation mobile communications (3rd-Generation mobile communication, 3G) standard, and a fourth generation mobile communications (4th Generation mobile communication, 4G) standard, and some mobile terminals can even support a fifth generation mobile communications (5th-Generation mobile communication, 5G) standard. The 2G communications standard includes a global system for mobile communications (global system for mobile communications, GSM), code division multiple access (code division multiple access, CDMA), and the like. The 3G communications standard includes wideband code division multiple access (wideband code division multiple access, W-CDMA), time division-synchronous code division multiple access (time division-synchronous code division multiple access, TD-SCDMA), and the like. The 4G communications standard includes long term evolution (long term evolution, LTE) and the like of a universal mobile communications technology. The 5G communications standard includes a new radio (new radio access technology in 3GPP, NR) and the like. In addition, the standards supported by the mobile terminals usually include a plurality of operating bands. For example, the GSM includes two operating bands: 900 MHz and 1800 MHz. The LTE includes dozens of operating bands, for example, common bands such as a band 1, a band 3, a band 38, a band 39, and a band 40.

Further, two or more identification cards such as subscriber identification module (subscriber identification module, SIM) cards may be inserted into a mobile terminal. Different identification cards may access a plurality of operating bands included in different communications standards, and communication services are set up based on the operating bands.

However, in a research process of this application, the inventor finds that an identification card in a mobile terminal usually interferes with another identification card during a communication service.

SUMMARY

To resolve a prior-art problem that an identification card in a mobile terminal usually interferes with another identification card during a communication service, this application discloses a network selection method and apparatus applied to a mobile terminal.

According to a first aspect, this application provides a network selection method applied to a mobile terminal, a first card slot and a second card slot are disposed in the mobile terminal, and when the first card slot accommodates a first identification card and the second card slot accommodates a second identification card, the network selection method applied to the mobile terminal includes:

executing, by the mobile terminal, a communication service by using the first identification card;

determining that the communication service of the first identification card interferes with the second identification card; and adjusting cell reselection information of the second identification card, so that the second identification card reselects to a non-interfered-with cell.

According to the solution disclosed in the embodiments of this application, the communication service of the first identification card can be prevented from interfering with the second identification card, to resolve a prior-art problem.

With reference to the first aspect, in a first possible implementation of the first aspect, the determining that the communication service of the first identification card interferes with the second identification card includes:

determining that a difference between a product of a transmit frequency of the first identification card and M and a receive frequency of the second identification card falls within a preset range, where M is a positive integer; and/or determining that a difference between a product of the receive frequency of the second identification card and N and the transmit frequency of the first identification card falls within a preset range, where N is a positive integer.

According to the foregoing steps, it can be determined whether the communication service of the first identification card interferes with the second identification card.

With reference to the first aspect, in a second possible implementation of the first aspect, the determining that the communication service of the first identification card interferes with the second identification card includes:

determining that a first cell identifier is different from a second cell identifier, where the first cell identifier is a cell identifier of a serving cell of the first identification card, and the second cell identifier is a cell identifier of a serving cell of the second identification card; and determining that a difference between a product of a transmit frequency of the first identification card and M and a receive frequency of the second identification card falls within a preset range, where M is a positive integer; and/or determining that the first cell identifier is different from the second cell identifier, where the first cell identifier is the cell identifier of the serving cell of the first identification card, and the second cell identifier is the cell identifier of the serving cell of the second identification card; and determining that a difference between a product of the receive frequency of the second identification card and N and the transmit frequency of the first identification card falls within a preset range, where N is a positive integer.

According to the foregoing steps, during determining of whether the communication service of the first identification card interferes with the second identification card, if it is determined, based on the cell identifiers, that the first identification card and the second identification card access a same serving cell, it is determined that no interference occurs between the first identification card and the second identification card, and the product of the transmit frequency of the first identification card and M is no longer to be obtained, thereby simplifying a subsequent working procedure.

With reference to the first aspect, in a third possible implementation of the first aspect, the adjusting cell reselection information of the second identification card, so that the second identification card reselects to a non-interfered-with cell includes:

decreasing a cell priority of a serving cell of the second identification card, and/or increasing a cell priority of the non-interfered-with cell of the second identification card, so that the cell priority of the non-interfered-with cell of the second identification card is higher than the cell priority of the serving cell of the second identification card; and/or decreasing a cell measurement value of the serving cell of the second identification card, and/or increasing a cell measurement value of the non-interfered-with cell of the second identification card, so that the cell measurement value of the non-interfered-with cell of the second identification card is greater than the cell measurement value of the serving cell of the second identification card; and/or increasing a reselection threshold of the serving cell of the second identification card, so that the second identification card cannot access the serving cell.

According to the foregoing steps, the second identification card can reselect to the non-interfered-with cell, to prevent the communication service of the first identification card from interfering with the second identification card.

With reference to the first aspect, in a fourth possible implementation of the first aspect, after the executing, by the mobile terminal, a communication service by using the first identification card, the method further includes:

determining that the communication service of the first identification card does not interfere with the second identification card; and adjusting the cell reselection information of the second identification card, to prevent the second identification card from reselecting to an interfered-with cell.

In the foregoing embodiment, if it is determined that the communication service of the first identification card does not interfere with the second identification card, the cell reselection information of the second identification card is adjusted to prevent the second identification card from reselecting to the interfered-with cell, thereby ensuring that the communication service of the first identification card does not interfere with the second identification card.

With reference to the fourth possible implementation of the first aspect, in a fifth possible implementation of the first aspect, the adjusting the cell reselection information of the second identification card, to prevent the second identification card from reselecting to an interfered-with cell includes:

increasing a cell priority of a serving cell of the second identification card, and/or decreasing a cell priority of the interfered-with cell of the second identification card; and/or increasing a cell measurement value of the serving cell of the second identification card, and/or decreasing a cell measurement value of the interfered-with cell of the second identification card; and/or decreasing a reselection threshold of the serving cell of the second identification card.

With reference to the first aspect, in a sixth possible implementation of the first aspect, after the determining that the communication service of the first identification card does not interfere with the second identification card, or after the adjusting cell reselection information of the second identification card, so that the second identification card reselects to a non-interfered-with cell, the method further includes:

executing, by the mobile terminal, a communication service by using the second identification card;

comparing a priority of the first identification card with a priority of the second identification card based on the communication service of the first identification card and the communication service of the second SIM; and stopping reporting a cell measurement value of a low-priority identification card for an interfered-with cell; and/or decreasing the cell measurement value of the low-priority identification card for the interfered-with cell, and reporting a decreased cell measurement value.

According to a second aspect, this application provides a network selection method applied to a mobile terminal, a first card slot and a second card slot are disposed in the mobile terminal, and when the first card slot accommodates a first identification card and the second card slot accommodates a second identification card, the network selection method applied to the mobile terminal includes:

executing, by the mobile terminal, communication services by using the first identification card and the second identification card;

determining that the communication service of the first identification card interferes with the second identification card and the communication service of the second identification card interferes with the first identification card;

determining a priority of the first identification card and a priority of the second identification card based on the communication service of the first identification card and the communication service of the second identification card;

terminating a communication service of a low-priority identification card, and adjusting cell reselection information of the low-priority identification card, so that the low-priority identification card reselects to a non-interfered-with cell; and after the low-priority identification card reselects to the non-interfered-with cell, controlling the low-priority identification card to execute a corresponding communication service.

According to the solution disclosed in the embodiments of this application, a communication service can be prevented from interfering with another identification card when different identification cards in the mobile terminal execute communication services, to resolve a prior-art problem.

With reference to the second aspect, in a first possible implementation of the second aspect, after the terminating a communication service of a low-priority identification card, and adjusting cell reselection information of the low-priority identification card, so that the low-priority identification card reselects to a non-interfered-with cell, the method further includes:

stopping reporting a cell measurement value of the low-priority identification card for an interfered-with cell; and/or decreasing the cell measurement value of the low-priority identification card for the interfered-with cell, and reporting a decreased cell measurement value.

According to a third aspect, this application provides a network selection apparatus applied to a mobile terminal, a first card slot and a second card slot are disposed in the mobile terminal, and when the first card slot accommodates a first identification card and the second card slot accommodates a second identification card, the network selection apparatus applied to the mobile terminal includes:
- a service execution module, configured to execute a communication service by using the first identification card;
- a first determining module, configured to determine that the communication service of the first identification card interferes with the second identification card; and
- a first reselection module, configured to adjust cell reselection information of the second identification card, so that the second identification card reselects to a non-interfered-with cell.

With reference to the third aspect, in a first possible implementation of the third aspect, the first reselection module includes:
- a first priority adjustment unit, configured to decrease a cell priority of a serving cell of the second identification card, and/or increase a cell priority of the non-interfered-with cell of the second identification card, so that the cell priority of the non-interfered-with cell of the second identification card is higher than the cell priority of the serving cell of the second identification card; and/or
- a first measurement value adjustment unit, configured to decrease a cell measurement value of the serving cell of the second identification card, and/or increase a cell measurement value of the non-interfered-with cell of the second identification card, so that the cell measurement value of the non-interfered-with cell of the second identification card is greater than the cell measurement value of the serving cell of the second identification card; and/or
- a first threshold adjustment unit, configured to increase a reselection threshold of the serving cell of the second identification card, so that the second identification card cannot access the serving cell.

With reference to the third aspect, in a second possible implementation of the third aspect, the apparatus further includes:
- a second determining module, configured to: after the service execution module executes the communication service by using the first identification card, determine that the communication service of the first identification card does not interfere with the second identification card; and
- a second reselection module, configured to adjust the cell reselection information of the second identification card, to prevent the second identification card from reselecting to an interfered-with cell.

With reference to the third aspect, in a third possible implementation of the third aspect, the second reselection module includes:
- a second priority adjustment unit, configured to increase a cell priority of a serving cell of the second identification card, and/or decrease a cell priority of the interfered-with cell of the second identification card; and/or
- a second measurement value adjustment unit, configured to increase a cell measurement value of the serving cell of the second identification card, and/or decrease a cell measurement value of the interfered-with cell of the second identification card; and/or
- a second threshold adjustment unit, configured to decrease a reselection threshold of the serving cell of the second identification card.

According to a fourth aspect, this application provides a network selection apparatus applied to a mobile terminal, a first card slot and a second card slot are disposed in the mobile terminal, and when the first card slot accommodates a first identification card and the second card slot accommodates a second identification card, the network selection apparatus applied to the mobile terminal includes:
- a communication execution module, configured to execute communication services by using the first identification card and the second identification card;
- an interference determining module, configured to determine that the communication service of the first identification card interferes with the second identification card and the communication service of the second identification card interferes with the first identification card;
- a priority determining module, configured to determine a priority of the first identification card and a priority of the second identification card based on the communication service of the first identification card and the communication service of the second identification card;
- a cell reselection module, configured to terminate a communication service of a low-priority identification card, and adjust cell reselection information of the low-priority identification card, so that the low-priority identification card reselects to a non-interfered-with cell; and
- a communication control module, configured to: after the low-priority identification card reselects to the non-interfered-with cell, control the low-priority identification card to execute a corresponding communication service.

According to a fifth aspect, this application provides a mobile terminal, a first card slot and a second card slot are disposed in the mobile terminal, and when the first card slot accommodates a first identification card and the second card slot accommodates a second identification card, the mobile terminal includes:
- a memory, a processor, and a computer program that is stored in the memory and that can be run on the processor, where when executing the computer program, the processor implements the method according to the first aspect or any implementation of the first aspect.

According to a sixth aspect, this application provides a mobile terminal, a first card slot and a second card slot are disposed in the mobile terminal, and when the first card slot accommodates a first identification card and the second card slot accommodates a second identification card, the mobile terminal includes:
- a memory, a processor, and a computer program that is stored in the memory and that can be run on the processor, where when executing the computer program, the processor implements the method according to the second aspect or any implementation of the second aspect.

According to a seventh aspect, this application provides a computer readable medium, including an instruction, and when the instruction is run on a computer, the computer is enabled to perform the method according to the first aspect or any implementation of the first aspect.

According to an eighth aspect, this application provides a computer readable medium, including an instruction, and when the instruction is run on a computer, the computer is enabled to perform the method according to the second aspect or any implementation of the second aspect.

According to a ninth aspect, this application provides a network selection method applied to a mobile terminal, there is a first eSIM card and a second eSIM card in the mobile terminal, and the network selection method applied to the mobile terminal includes:

executing, by the mobile terminal, a communication service by using the first eSIM card;

determining that the communication service of the first eSIM card interferes with the second eSIM card; and adjusting cell reselection information of the second eSIM card, so that the second eSIM card reselects to a non-interfered-with cell.

According to the solution disclosed in the embodiments of this application, the communication service of the first eSIM card can be prevented from interfering with the second eSIM card, to resolve a prior-art problem.

According to a tenth aspect, this application provides a network selection method applied to a mobile terminal, there is a first eSIM card and a second eSIM card in the mobile terminal, and the network selection method applied to the mobile terminal includes:

executing, by the mobile terminal, communication services by using the first eSIM card and the second eSIM card;

determining that the communication service of the first eSIM card interferes with the second eSIM card and the communication service of the second eSIM card interferes with the first eSIM card;

determining a priority of the first eSIM card and a priority of the second eSIM card based on the communication service of the first eSIM card and the communication service of the second eSIM card;

terminating a communication service of a low-priority eSIM card, and adjusting cell reselection information of the low-priority eSIM card, so that the low-priority eSIM card re selects to a non-interfered-with cell; and after the low-priority eSIM card reselects to the non-interfered-with cell, controlling the low-priority eSIM card to execute a corresponding communication service.

According to the solution disclosed in the embodiments of this application, a communication service can be prevented from interfering with another eSIM card when different eSIM cards in the mobile terminal execute communication services, to resolve a prior-art problem.

The embodiments of this application disclose the network selection method and apparatus applied to the mobile terminal. In this method, first, when a communication service is executed by using the first identification card, it is detected whether the communication service of the first identification card interferes with the second identification card. When it is determined that the communication service of the first identification card interferes with the second identification card, the cell reselection information of the second identification card is adjusted, so that the second identification card reselects to the non-interfered-with cell, and the communication service of the first identification card no longer interferes with the second identification card.

According to the solution disclosed in the embodiments of this application, the communication service of the first identification card can be prevented from interfering with the second identification card, to resolve a prior-art problem.

BRIEF DESCRIPTION OF DRAWINGS

To describe the technical solutions in this application more clearly, the following briefly describes the accompanying drawings for describing the embodiments. It is clearly that a person of ordinary skill in the art may derive other drawings from these accompanying drawings without creative efforts.

FIG. 3 is a schematic diagram of frequency distribution in an LTE standard according to the prior art;

FIG. 4 is a schematic diagram of a working procedure of determining whether a communication service of a first identification card interferes with a second identification card in a network selection method applied to a mobile terminal according to an embodiment of this application;

FIG. 5 is a schematic diagram of a working procedure of determining whether a communication service of a first identification card interferes with a second identification card in a network selection method applied to a mobile terminal according to an embodiment of this application;

DESCRIPTION OF EMBODIMENTS

To resolve a prior-art problem that an identification card in a mobile terminal usually interferes with another identification card during a communication service, this application discloses a network selection method and apparatus applied to the mobile terminal.

In the mobile terminal in the embodiments of this application, at least two card slots are disposed: a first card slot and a second card slot. A first identification card is installed in the first card slot, and a second identification card is installed in the second card slot. The identification card is used to identify a user identity. Different identification cards each are configured with an independent radio frequency (radio frequency, RF) system, or can share a same RF system. In addition, each identification card may be accommodated in one card slot in the mobile terminal.

There may be a plurality of types of identification cards. For example, the identification cards may be a subscriber identification module (subscriber identification module, SIM) card, a user identifier module (user identifier module, UIM) card, and a universal integrated circuit card (universal integrated circuit card, UICC).

The SIM card stores information such as user identification—related data, SMS message data, and phone numbers. Based on sizes of SIM cards, the SIM cards may be classified into a mini-SIM card, a micro-SIM card, a nano-SIM card, and the like. The mini-SIM card is usually 25 mm×15 mm in size and is referred to as a standard SIM card. The micro-SIM card is usually 15 mm×12 mm in size and is referred to as a micro-SIM card. The nano-SIM card is usually 12 mm×9 mm in size and is referred to as a nano-SIM card. In addition, with development of communications technologies, there is also a universal subscriber identification module (universal subscriber identification module, USIM) card currently, and the USIM card may also be referred to as an enhanced SIM card. The USIM card stores subscription information, authentication information, and SMS messages of a user, and is applied to a universal mobile telecommunications system network.

The UIM is a user identification and encryption technology that is used on mobile communication terminals and that is initiated by China Unicom and supported by international CDMA organizations. The UIM card can perform user identification and communication encryption, and can further store personal information such as phone numbers and SMS messages of a user.

As a removable smart card, the UICC stores information such as user identification—related data, a phone book, and SMS messages. In addition, the UICC may include both a USIM card and a common SIM card, or include only a USIM card, or include only a common SIM card.

Certainly, the identification card in the embodiments of this application may alternatively be of another type. This is not limited in the embodiments of this application.

Figure 1:
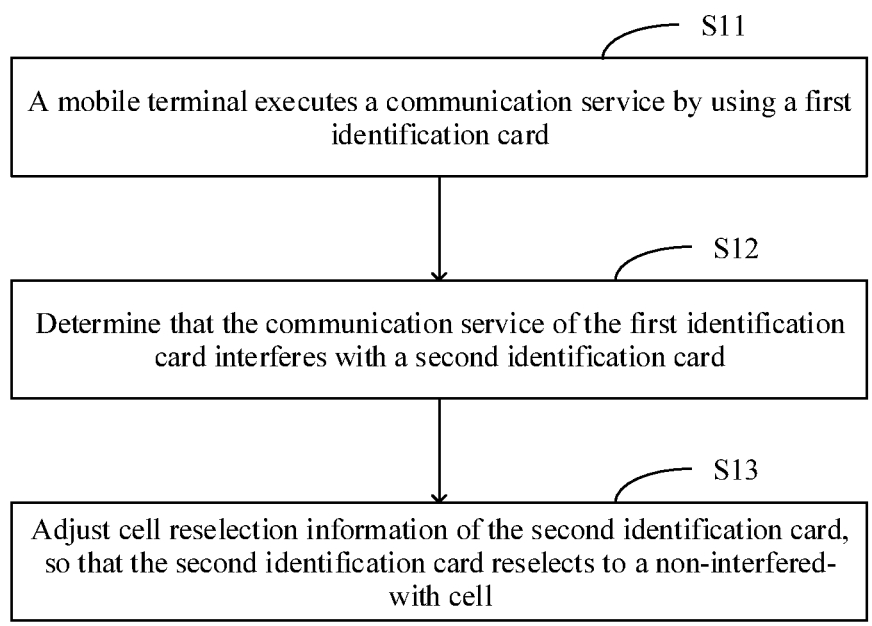
FIG. 1 is a schematic diagram of a working procedure of a network selection method applied to a mobile terminal according to an embodiment of this application.

A first embodiment of this application discloses a network selection method applied to a mobile terminal. A first card slot and a second card slot are disposed in the mobile terminal. When the first card slot accommodates a first identification card and the second card slot accommodates a second identification card, referring to a schematic diagram of a working procedure shown in FIG. 1, the network selection method applied to the mobile terminal includes the following steps.

Step S11: The mobile terminal executes a communication service by using the first identification card.

In this step, the second identification card may be in a standby state. The standby state is a non-service state. If the second identification card is in the standby state, it indicates that the second identification card only needs to receive a paging message periodically, to keep synchronous with a network. Alternatively, the second identification card may be in another state. This is not limited in this embodiment of this application.

The first identification card may support a plurality of communications standards such as a GSM, CDMA, TDSCDMA, WCDMA, LTE, and NR. Correspondingly, the second identification card may support a plurality of communications standards such as a GSM, CDMA, TDSCDMA, WCDMA, LTE, and NR. In addition, the first identification card and the second identification card may support a same communications standard or different communications standards. This is not limited in this embodiment of this application.

In addition, the communication service executed by using the first identification card may be making a call, accessing the internet, or the like. This is not limited in this embodiment of this application. When the communication service is executed by using the first identification card, a corresponding electromagnetic wave signal usually needs to be sent. The electromagnetic wave signal usually interferes with a radio frequency system of the second identification card, and consequently interferes with the second identification card.

Step S12: Determine that the communication service of the first identification card interferes with the second identification card.

When the communication service is executed by using the first identification card, a signal usually needs to be sent. The signal is usually an electromagnetic wave signal, which may interfere with the second identification card. Therefore, when it is determined that the communication service is to be executed by using the first identification card in step S11, it needs to be detected whether the communication service of the first identification card interferes with the second identification card.

Step S13: Adjust cell reselection information of the second identification card, so that the second identification card reselects to a non-interfered-with cell.

In this step, when it is determined that the communication service of the first identification card interferes with the second identification card, the cell reselection information of the second identification card is adjusted, so that the second identification card reselects to the non-interfered-with cell. The cell reselection information includes a cell priority, a cell measurement value, and/or a reselection threshold. The non-interfered-with cell is a cell that is not interfered with by the communication service of the first identification card. To be specific, if the second identification card reselects to the non-interfered-with cell, the communication service of the first identification card does not interfere with the second identification card.

After an identification card in the mobile terminal accesses a serving cell, the mobile terminal can obtain cell priorities of the serving cell and a neighboring cell of the identification card. In addition, the cell priorities of the serving cell and the neighboring cell may be further arranged through a priority list. The serving cell usually has a relatively high cell priority. In this embodiment of this application, a cell priority of the second identification card is adjusted, so that the second identification card can reselect to the non-interfered-with cell.

After the identification card in the mobile terminal accesses the serving cell, the mobile terminal measures cell measurement values of the serving cell and the neighboring cell of the identification card, and determines, based on the cell measurement values, whether to perform cell reselection. In this embodiment of this application, a cell measurement value of the second identification card is adjusted, so that the second identification card can also reselect to the non-interfered-with cell.

In addition, to implement cell reselection, a corresponding reselection threshold is preset for each cell. When reselection information of the identification card in the mobile terminal in a cell is greater than the reselection threshold, the serving cell of the identification card usually reselects to the cell. In this embodiment of this application, the reselection threshold may be used as the cell reselection information. A reselection threshold of a serving cell of the second identification card is adjusted, so that the second identification card cannot access the current serving cell, but reselects to the non-interfered-with cell.

In the network selection method applied to the mobile terminal disclosed in this embodiment of this application, the mobile terminal first executes the communication service by using the first identification card. Then, after it is determined that the communication service of the first identification card interferes with the second identification card in the mobile terminal, the cell reselection information of the second identification card is adjusted, so that the second identification card reselects to the non-interfered-with cell, and the communication service of the first identification card no longer interferes with the second identification card.

According to the solution disclosed in this embodiment of this application, the communication service of the first identification card can be prevented from interfering with the second identification card, to resolve a prior-art problem.

To describe in detail how to determine whether the communication service of the first identification card interferes with the second identification card, this application discloses the following embodiment. In this embodiment, the determining that the communication service of the first identification card interferes with the second identification card includes the following step:

determining that a difference between a product of a transmit frequency of the first identification card and M and a receive frequency of the second identification card falls within a preset range, where M is a positive integer.

In a specific execution process, the product of the transmit frequency of the first identification card and M may be calculated, and then it is detected whether the difference between the product and the receive frequency of the second identification card falls within the preset range. If the difference falls within the preset range, it is determined that the communication service of the first identification card interferes with the second identification card.

A frequency is also referred to as a center frequency (Centre Frequency), and is a center frequency in an operating band range of a cell. For example, if an operating band of a cell ranges from A MHz to B MHz, a frequency of the cell is (A+B)/2 MHz. Correspondingly, a transmit frequency is a center frequency in a band range used when the cell sends a signal, and a receive frequency is a center frequency in a band range used when the cell receives a signal.

It is assumed that M is 1, and after the product of the transmit frequency of the first identification card and M is obtained, it is determined that the difference between the product and the receive frequency of the second identification card falls within the preset range. In this case, it indicates that the transmit frequency of the first identification card is relatively close to the receive frequency of the second identification card, and a signal sent by using the first identification card usually affects the radio frequency system of the second identification card. In other words, the communication service of the first identification card interferes with the second identification card.

In addition, it is assumed that M is a positive integer other than 1, and after the product of the transmit frequency of the first identification card and M is obtained, it is determined that the difference between the product and the receive frequency of the second identification card falls within the preset range. In this case, it indicates that an integer multiple of the transmit frequency of the first identification card is relatively close to the receive frequency of the second identification card. In this case, a signal sent by using the first identification card usually also affects the radio frequency system of the second identification card. In other words, the communication service of the first identification card interferes with the second identification card.

In another manner, the determining that the communication service of the first identification card interferes with the second identification card includes the following step: determining that a difference between a product of the receive frequency of the second identification card and N and the transmit frequency of the first identification card falls within a preset range, where N is a positive integer.

In a specific execution process, the product of the receive frequency of the second identification card and N may be calculated, and then it is detected whether the difference between the product and the transmit frequency of the first identification card falls within the preset range.

If the difference falls within the preset range, it is determined that the communication service of the first identification card interferes with the second identification card.

It is assumed that N is 1, and after the product of the receive frequency of the second identification card and N is obtained, it is determined that the difference between the product and the transmit frequency of the first identification card falls within the preset range. In this case, it indicates that the transmit frequency of the first identification card is relatively close to the receive frequency of the second identification card, and a signal sent by using the first identification card usually affects the radio frequency system of the second identification card. In other words, the communication service of the first identification card interferes with the second identification card.

In addition, it is assumed that N is a positive integer other than 1, and after the product of the receive frequency of the second identification card and N is obtained, it is determined that the difference between the product and the transmit frequency of the first identification card falls within the preset range. In this case, it indicates that an integer multiple of the receive frequency of the second identification card is relatively close to the transmit frequency of the first identification card. In this case, a signal sent by using the first identification card usually also affects the radio frequency system of the second identification card. In other words, the communication service of the first identification card interferes with the second identification card.

According to the foregoing embodiment, if the transmit frequency of the first identification card is relatively close to the receive frequency of the second identification card, or an integer multiple of the transmit frequency of the first identification card is relatively close to the receive frequency of the second identification card, or an integer multiple of the receive frequency of the second identification card is relatively close to the transmit frequency of the first identification card, the communication service of the first identification card interferes with the second identification card. Therefore, this application discloses another embodiment, to determine whether the communication service of the first identification card interferes with the second identification card. Referring to a schematic diagram of a working procedure shown in FIG. 2, the determining that the communication service of the first identification card interferes with the second identification card includes the following steps:

Step S21: Obtain the product of the transmit frequency of the first identification card and M, where M is a positive integer.

Step S22: Detect whether the difference between the product obtained in step S21 and the receive frequency of the second identification card falls within the preset range.

If the difference does not fall within the preset range, an operation in step S23 is to be performed; or if the difference falls within the preset range, an operation in step S26 is to be performed.

Step S23: Obtain the product of the receive frequency of the second identification card and N, where N is a positive integer.

Step S24: Detect whether the difference between the product obtained in step S23 and the transmit frequency of the first identification card falls within the preset range.

If the difference does not fall within the preset range, an operation in step S25 is to be performed; or if the difference falls within the preset range, an operation in step S26 is to be performed.

Step S25: Determine that the communication service of the first identification card does not interfere with the second identification card.

Step S26: Determine that the communication service of the first identification card interferes with the second identification card.

Figure 2:
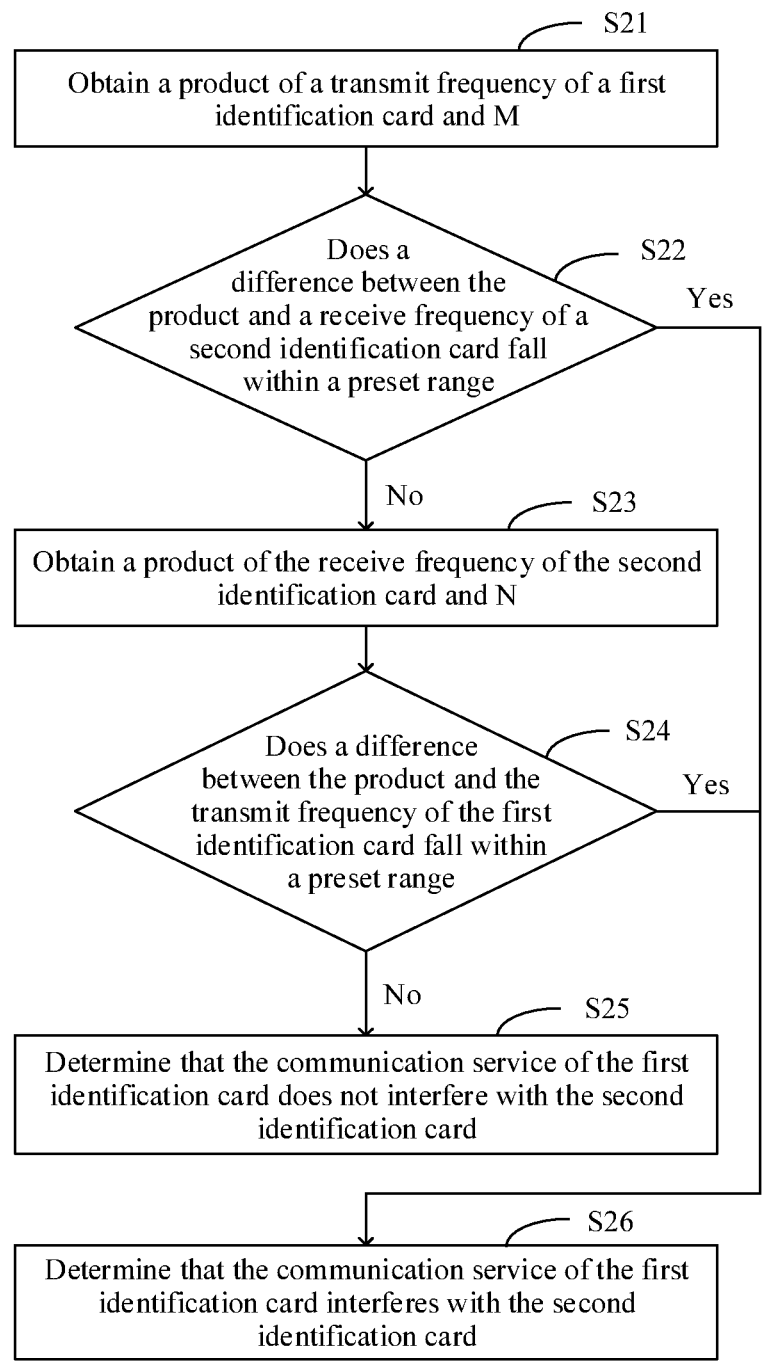
FIG. 2 is a schematic diagram of a working procedure of determining whether a communication service of a first identification card interferes with a second identification card in a network selection method applied to a mobile terminal according to an embodiment of this application.

In the foregoing steps and the schematic diagram of the working procedure shown in FIG. 2, after the product of the transmit frequency of the first identification card and M is obtained and it is determined that the difference between the product and the receive frequency of the second identification card falls within the preset range, the product of the receive frequency of the second identification card and N is obtained, and it is detected whether the difference between the product and the transmit frequency of the first identification card falls within the preset range. In actual application, there is no strict time sequence of the foregoing operations. For example, first, the product of the receive frequency of the second identification card and N may be obtained, and it may be detected whether the difference between the product and the transmit frequency of the first identification card falls within the preset range. After it is determined that the difference between the product and the transmit frequency of the first identification card falls within the preset range, the product of the transmit frequency of the first identification card and M is obtained, and it is determined that the difference between the product and the receive frequency of the second identification card falls within the preset range.

In the foregoing steps, if the product of the transmit frequency of the first identification card and M is obtained and the difference between the product and the receive frequency of the second identification card does not fall within the preset range, and in addition, if the product of the receive frequency of the second identification card and N is obtained and the difference between the product and the transmit frequency of the first identification card does not fall within the preset range, it may be determined that the communication service of the first identification card does not interfere with the second identification card.

For example, FIG. 3 is a schematic diagram of frequency distribution of LTE standards of three operators: China Mobile, China Unicorn, and China Telecom. In the figure, in the LTE standard provided by China Unicom/China Telecom, a downlink (downlink, DL) band of a band 3 provided by a frequency division duplex (Frequency Division Duplexing, FDD) system ranges from 1840 MHz to 1880 MHz. In addition, in the LTE standard provided by China Mobile, DL and uplink (uplink, UL) bands of a band 39 provided by a time division duplex (Time Division Duplexing, TDD) system ranges from 1880 MHz to 1920 MHz. In the LTE standard provided by China Unicom/China Telecom, a UL band of a band provided by the FDD system ranges from 1920 MHz to 1980 MHz. Therefore, it can be learned that, if the first identification card in the mobile terminal sends a signal through the band 39 provided by China Mobile, and the second identification card uses the band 3 provided by China Unicom/China Telecom, the transmit frequency of the first identification card is close to the receive frequency of the second identification card, and the communication service of the first identification card interferes with the second identification card. In addition, if the first identification card in the mobile terminal sends a signal through the band 1 provided by China Unicom/China Telecom, and the second identification card uses the band 39 provided by China Mobile, the transmit frequency of the first identification card is close to the receive frequency of the second identification card, and the communication service of the first identification card interferes with the second identification card.

In addition, the mobile terminal can obtain a cell identifier of a serving cell. In this case, this application discloses another embodiment, to determine whether the communication service of the first identification card interferes with the second identification card. Referring to a schematic diagram of a working procedure shown in FIG. 4, in this embodiment of this application, the determining that the communication service of the first identification card interferes with the second identification card includes the following steps.

Step S31: Determine that a first cell identifier is different from a second cell identifier.

The first cell identifier is a cell identifier of a serving cell of the first identification card, and the second cell identifier is a cell identifier of the serving cell of the second identification card.

Step S32: Determine that the difference between the product of the transmit frequency of the first identification card and M and the receive frequency of the second identification card falls within the preset range, where M is a positive integer.

A cell identifier is unique in a network that can be accessed by the mobile terminal, and the mobile terminal can distinguish cells based on cell identifiers. The cell identifier may be a cell number (namely, a cell ID). Certainly, the cell identifier may alternatively be other information that can be used to distinguish cells. This is not limited in this embodiment of this application.

In the foregoing embodiment, it is first detected whether the first cell identifier is the same as the second cell identifier. When the first cell identifier is different from the second cell identifier, the product of the transmit frequency of the first identification card and M is obtained, and then it is detected whether the difference between the product and the receive frequency of the second identification card falls within the preset range. If the difference falls within the preset range, it is determined that the communication service of the first identification card interferes with the second identification card.

If the first cell identifier is the same as the second cell identifier, it indicates that the serving cell of the first identification card is the same as the serving cell of the second identification card. In this case, the serving cell of the first identification card and the second identification card may be a frequency division multiplexing cell or a time division multiplexing cell. If the serving cell is a frequency division multiplexing cell, the serving cell may transmit signals of different identification cards through different bands, to be specific, transmit signals of the first identification card and the second identification card through frequency division multiplexing. In addition, if the serving cell is a time division multiplexing cell, the serving cell may transmit signals of different identification cards through different time resources, to be specific, transmit signals of the first identification card and the second identification card through time division multiplexing. Therefore, if the first identification card and the second identification card access the same serving cell, interference rarely occurs between the first identification card and the second identification card.

In this embodiment of this application, if it is determined, based on the cell identifiers, that the first identification card and the second identification card access the same serving cell, it is determined that no interference occurs between the first identification card and the second identification card, and the product of the transmit frequency of the first identification card and M is no longer to be obtained, thereby simplifying a subsequent working procedure.

In addition, referring to a schematic diagram of a working procedure shown in FIG. 5, in another embodiment, the determining that the communication service of the first identification card interferes with the second identification card includes the following steps.

Step S41: Determine that a first cell identifier is different from a second cell identifier.

The first cell identifier is a cell identifier of a serving cell of the first identification card, and the second cell identifier is a cell identifier of the serving cell of the second identification card.

Step S42: Determine that the difference between the product of the receive frequency of the second identification card and N and the transmit frequency of the first identification card falls within the preset range, where N is a positive integer.

In the foregoing embodiment, it is first detected whether the first cell identifier is the same as the second cell identifier. When the first cell identifier is different from the second cell identifier, the product of the receive frequency of the second identification card and N is obtained, and then it is detected whether the difference between the product of the receive frequency of the second identification card and N and the transmit frequency of the first identification card falls within the preset range. If the difference falls within the preset range, it is determined that the communication service of the first identification card interferes with the second identification card.

Correspondingly, in the foregoing embodiment, if it is determined, based on the cell identifiers, that the first identification card and the second identification card access the same serving cell, it is determined that no interference occurs between the first identification card and the second identification card, and the product of the transmit frequency of the first identification card and M is no longer to be obtained, thereby simplifying a subsequent working procedure.

Figure 6:
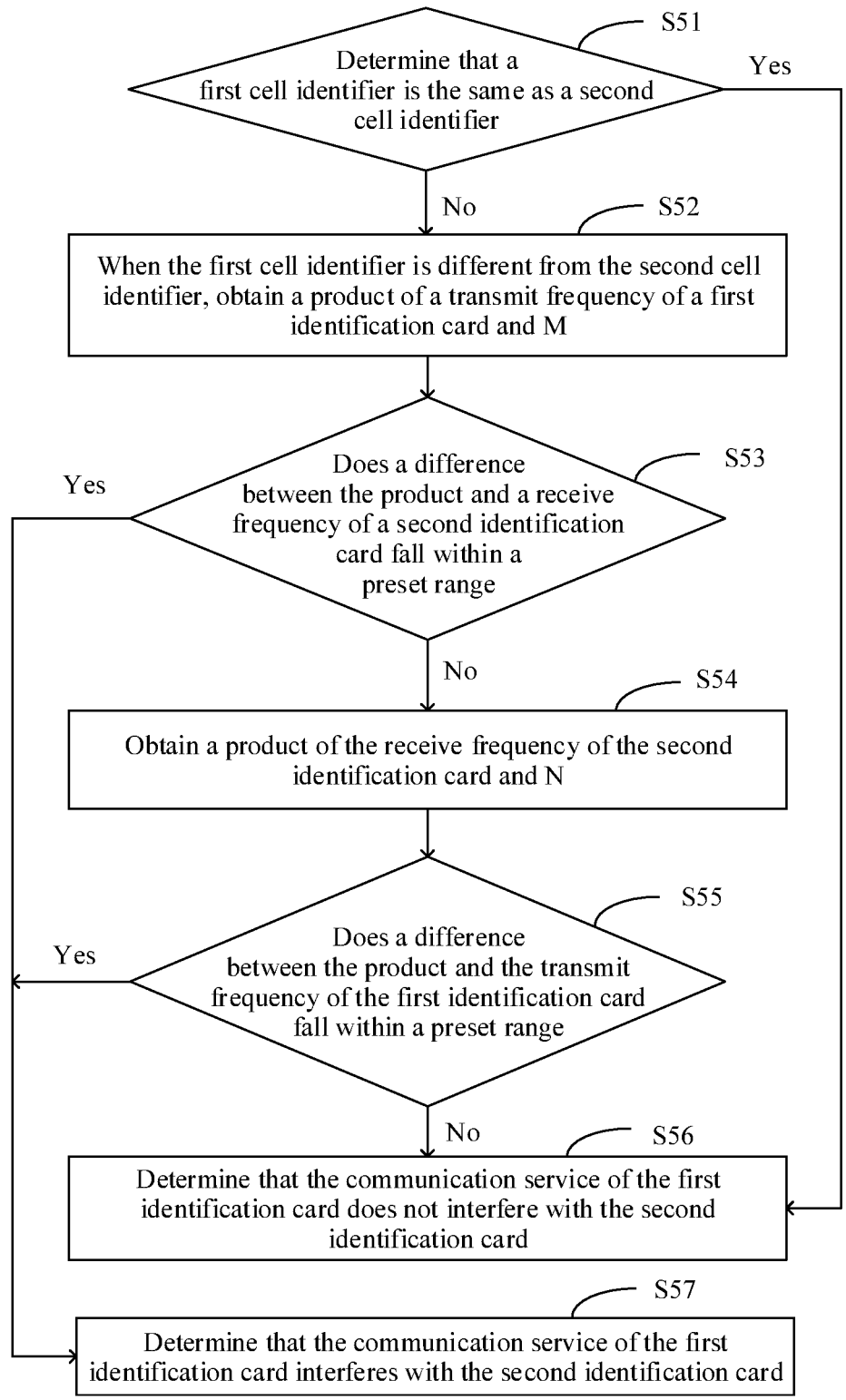
FIG. 6 is a schematic diagram of a working procedure of determining whether a communication service of a first identification card interferes with a second identification card in a network selection method applied to a mobile terminal according to an embodiment of this application.

When it is determined that the first cell identifier is different from the second cell identifier, it may be further determined, based on the product of the transmit frequency of the first identification card and M and the product of the receive frequency of the second identification card and N, whether the communication service of the first identification card interferes with the second identification card. In this case, this application discloses another embodiment. Referring to a schematic diagram of a working procedure shown in FIG. 6, in this embodiment, the determining that the communication service of the first identification card interferes with the second identification card includes the following steps.

Step S51: Detect whether a first cell identifier is the same as a second cell identifier. If the first cell identifier is different from the second cell identifier, an operation in step S52 is to be performed; or if the first cell identifier is the same as the second cell identifier, an operation in step S56 is to be performed.

The first cell identifier is a cell identifier of a serving cell of the first identification card, and the second cell identifier is a cell identifier of the serving cell of the second identification card.

If it is determined, according to step S51, that the first cell identifier is the same as the second cell identifier, interference rarely occurs between the first identification card and the second identification card. Therefore, it may be determined that the communication service of the first identification card does not interfere with the second identification card.

Step S52: When the first cell identifier is different from the second cell identifier, obtain the product of the transmit frequency of the first identification card and M, where M is a positive integer.

Step S53: Detect whether the difference between the product and the receive frequency of the second identification card falls within the preset range, and if the difference does not fall within the preset range, perform an operation in step S54, or if the difference falls within the preset range, perform an operation in step S57.

Step S54: Obtain the product of the receive frequency of the second identification card and N, where N is a positive integer.

Step S55: Detect whether the difference between the product and the transmit frequency of the first identification card falls within the preset range, and if the difference does not fall within the preset range, perform the operation in step S56, or if the difference falls within the preset range, perform the operation in step S57.

Step S56: Determine that the communication service of the first identification card does not interfere with the second identification card.

Step S57: Determine that the communication service of the first identification card interferes with the second identification card.

In the foregoing embodiment, if it is determined, based on the cell identifiers, that the first identification card and the second identification card access the same serving cell, it is determined that no interference occurs between the first identification card and the second identification card, and a subsequent operation is no longer to be performed, thereby simplifying a subsequent working procedure. In addition, if it is determined that the first cell identifier is different from the second cell identifier, it is further determined, based on the transmit frequency of the first identification card and the receive frequency of the second identification card, whether the communication service of the first identification card interferes with the second identification card.

Further, in step S12 in this embodiment of this application, when the communication service of the first identification card interferes with the second identification card, the cell reselection information of the second identification card is to be adjusted, so that the second identification card reselects to the non-interfered-with cell. The operation may be implemented in a plurality of manners.

In a manner, the adjusting cell reselection information of the second identification card, so that the second identification card reselects to a non-interfered-with cell includes:

decreasing a cell priority of a serving cell of the second identification card, and/or increasing a cell priority of the non-interfered-with cell of the second identification card, so that the cell priority of the non-interfered-with cell of the second identification card is higher than the cell priority of the serving cell of the second identification card.

After an identification card in the mobile terminal accesses a serving cell, the mobile terminal can obtain priorities of the serving cell and a neighboring cell of the identification card. In addition, the priorities of the serving cell and the neighboring cell may be further arranged through a priority list. The serving cell usually has a relatively high priority.

Usually, the mobile terminal detects signal quality of the serving cell and the neighboring cell, and determines the cell priorities of the serving cell and the neighboring cell based on the signal quality. The signal quality may be represented by a parameter such as a downlink signal receive power level.

In the foregoing manner, the cell priority is the cell reselection information. The cell priority of the serving cell of the second identification card is decreased, and/or the cell priority of the non-interfered-with cell of the second identification card is increased, so that the priority of the serving cell of the second identification card can be lower than the priority of the non-interfered-with cell of the second identification card. In this case, the second SIM reselects to the non-interfered-with cell, to prevent the communication service of the first identification card from interfering with the second identification card.

In another manner, the adjusting cell reselection information of the second identification card, so that the second identification card reselects to a non-interfered-with cell includes:

decreasing a cell measurement value of the serving cell of the second identification card, and/or increasing a cell measurement value of the non-interfered-with cell of the second identification card, so that the cell measurement value of the non-interfered-with cell of the second identification card is greater than the cell measurement value of the serving cell of the second identification card.

In the foregoing manner, the cell measurement value is the cell reselection information. After the identification card in the mobile terminal accesses the serving cell, the mobile terminal measures cell measurement values of the serving cell and the neighboring cell of the identification card, and determines, based on the cell measurement values, whether cell reselection needs to be performed. According to the foregoing steps, the cell measurement value of the serving cell of the second identification card is decreased, and/or the cell measurement value of the non-interfered-with cell of the second identification card is increased, so that the cell measurement value of the non-interfered-with cell of the second identification card is greater than the cell measurement value of the serving cell of the second identification card, and the second identification card reselects to the non-interfered-with cell, to prevent the communication service of the first identification card from interfering with the second identification card.

The cell measurement value may be a plurality of types of parameters. For example, in a 4G LTE protocol, the cell measurement value may be downlink signal receiving power (reference signal receiving power, RSRP) and/or downlink signal receiving quality (reference signal receiving quality, RSRQ). This is not limited in this embodiment of this application.

In addition, in another implementation, the adjusting cell reselection information of the second identification card, so that the second identification card reselects to a non-interfered-with cell includes:

increasing a reselection threshold of the serving cell of the second identification card, so that the second identification card cannot access the serving cell.

To implement cell reselection, a corresponding reselection threshold is preset for each cell. When cell reselection information of the identification card in the mobile terminal in a cell is greater than the reselection threshold, the serving cell of the identification card usually reselects to the cell.

In the foregoing manner, the reselection threshold is the cell reselection information. When the reselection threshold of the serving cell of the second identification card is to be increased according to the foregoing step, the reselection threshold may be increased to a preset threshold or may be increased to a high threshold, so that measurement reselection information of the second identification card cannot reach the reselection threshold. In this way, the second identification card cannot access the current serving cell, but reselects to the non-interfered-with cell, to prevent the communication service of the first identification card from interfering with the second identification card.

The reselection threshold may be thresholds of different parameters. For example, in the 4G LTE protocol, the reselection threshold may be a camping time threshold and/or a measurement start threshold.

If the reselection threshold is the camping time threshold, a camping time threshold of the second identification card in the serving cell may be set to a relatively large value, so that a camping time of the second identification card in the serving cell cannot be greater than the camping time threshold, and the second identification card cannot access the serving cell, but reselects to the non-interfered-with cell.

If the reselection threshold is the measurement start threshold, the measurement start threshold may be an RSRP threshold and/or an RSRQ threshold. If the measurement start threshold is the RSRP threshold, the RSRP threshold may be set to a relatively large value, so that RSRP of the second identification card in the serving cell cannot reach the RSRP threshold, and the second identification card cannot access the serving cell, but reselects to the non-interfered-with cell. In addition, if the measurement start threshold is the RSRQ threshold, the RSRQ threshold may be set to a relatively large value, so that RSRQ of the second identification card in the serving cell cannot reach the RSRQ threshold, and the second identification card cannot access the serving cell, but reselects to the non-interfered-with cell. Certainly, the measurement start threshold may alternatively be of another type. This is not limited in this embodiment of this application.

In the foregoing embodiment, three manners are disclosed, so that the second identification card cannot access the serving cell, but reselects to the non-interfered-with cell. In an actual application scenario, the mobile terminal may simultaneously execute any two of the foregoing manners, or simultaneously execute the foregoing three manners, so that the second identification card reselects to the non-interfered-with cell, to prevent the communication service of the first identification card from interfering with the second identification card.

According to the solution disclosed in the foregoing embodiment, when it is determined that the communication service of the first identification card interferes with the second identification card, the cell reselection information of the second identification card can be adjusted, so that the second identification card reselects to the non-interfered-with cell, and the second identification card implements interference avoidance network selection. In this way, the communication service of the first identification card is prevented from interfering with the second identification card. However, after the detection in step S11, in some cases, it may be determined that the communication service of the first identification card does not interfere with the second identification card. In this case, this application discloses another embodiment.

In this embodiment, after the mobile terminal executes the communication service by using the first identification card, the method further includes the following steps:

determining that the communication service of the first identification card does not interfere with the second identification card; and adjusting the cell reselection information of the second identification card, to prevent the second identification card from reselecting to an interfered-with cell.

The interfered-with cell is a receiving cell that is interfered with by the communication service of the first identification card. To be specific, if the serving cell of the second identification card is an interfered-with cell, the communication service of the first identification card interferes with the second identification card.

In the foregoing embodiment, if it is determined that the communication service of the first identification card does not interfere with the second identification card, the cell reselection information of the second identification card is adjusted to prevent the second identification card from reselecting to the interfered-with cell, thereby ensuring that the communication service of the first identification card does not interfere with the second identification card.

Further, there may be a plurality of manners for adjusting the cell reselection information of the second identification card, to prevent the second identification card from reselecting to the interfered-with cell.

In a manner, the adjusting the cell reselection information of the second identification card, to prevent the second identification card from reselecting to an interfered-with cell includes:

increasing a cell priority of the serving cell of the second identification card, and/or decreasing a cell priority of the interfered-with cell of the second identification card.

The priority of the serving cell of the second identification card is usually higher than the priority of the interfered-with cell of the second identification card. In this case, in the foregoing manner, when it is ensured that the priority of the serving cell of the second identification card is higher than the priority of the interfered-with cell of the second identification card, a difference between the two priorities can be further enlarged, to prevent the second identification card from reselecting to the interfered-with cell.

In another manner, the adjusting the cell reselection information of the second identification card, to prevent the second identification card from reselecting to an interfered-with cell includes:

increasing a cell measurement value of the serving cell of the second identification card, and/or decreasing a cell measurement value of the interfered-with cell of the second identification card.

The cell measurement value of the serving cell of the second identification card is usually higher than the cell measurement value of the interfered-with cell of the second identification card. In this case, in the foregoing manner, when it is ensured that the cell measurement value of the serving cell of the second identification card is higher than the cell measurement value of the interfered-with cell of the second identification card, a difference between the two cell measurement values can be further enlarged, to prevent the second identification card from reselecting to the interfered-with cell.

In another manner, the adjusting the cell reselection information of the second identification card, to prevent the second identification card from reselecting to an interfered-with cell includes:

decreasing a reselection threshold of the serving cell of the second identification card.

The reselection threshold of the second identification card in the serving cell is decreased, so that the second identification card can more easily reside in a state of accessing the current serving cell, and no longer perform cell reselection, to prevent the second identification card from reselecting to the interfered-with cell.

In the foregoing embodiment, three manners are disclosed, so that the second identification card resides in a state of accessing the current serving cell, to prevent the second identification card from reselecting to the interfered-with cell. In an actual application scenario, the mobile terminal may simultaneously perform any two of the foregoing manners, or simultaneously perform the foregoing three manners. This is not limited in this embodiment of this application.

Figure 7:
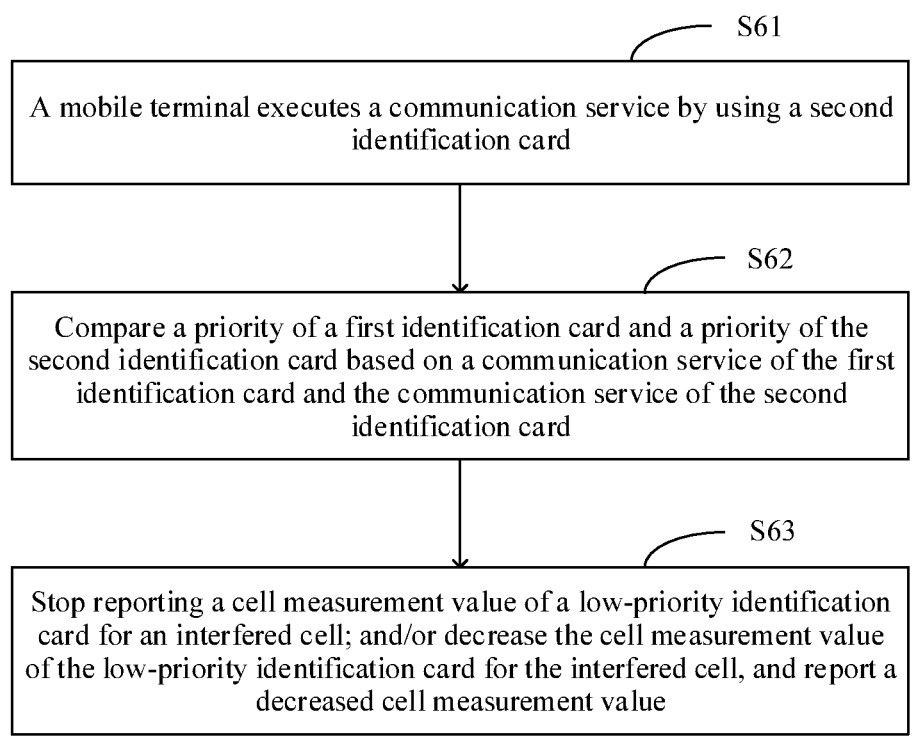
FIG. 7 is a schematic diagram of another working procedure of a network selection method applied to a mobile terminal according to an embodiment of this application.

In an actual application scenario, a communication service is also established by using the second identification card sometimes. To prevent the second identification card from being interfered with by the first identification card in this application scenario, this application discloses another embodiment. Referring to a schematic diagram of a working procedure shown in FIG. 7, after the determining that the communication service of the first identification card does not interfere with the second identification card, or after the adjusting the cell reselection information of the second identification card, so that the second identification card reselects to a non-interfered-with cell, the network selection method applied to the mobile terminal disclosed in this embodiment of this application further includes the following steps.

Step S61: The mobile terminal executes a communication service by using the second identification card.

Step S62: Compare a priority of the first identification card with a priority of the second identification card based on the communication service of the first identification card and the communication service of the second SIM.

In this embodiment of this application, corresponding priorities are preset for different communication services. Usually, a priority of a voice communication service is higher than a priority of a data communication service. For example, if a first communication service is making a call, and a second communication service is accessing the internet, a priority of the first communication service is usually set to be higher than a priority of the second communication service.

In this case, the priorities of the second identification card and the first identification card may be determined based on the communication services executed by using the second identification card and the first SIM.

Step S63: Stop reporting a cell measurement value of a low-priority identification card for an interfered-with cell; and/or decrease the cell measurement value of the low-priority identification card for the interfered-with cell, and report a decreased cell measurement value.

The interfered-with cell of the low-priority identification card is a receiving cell that can be interfered with by a communication service of a high-priority identification card. To be specific, if a serving cell of the low-priority identification card is an interfered-with cell, the communication service of the high-priority identification card interferes with the low-priority identification card.

After an identification card in the mobile terminal accesses a serving cell, the mobile terminal measures cell measurement values of the serving cell and a neighboring cell of the identification card, and reports the measured cell measurement values to the serving cell. After receiving the cell measurement values, the serving cell determines whether a cell handover needs to be performed. If the cell handover needs to be performed, the serving cell generates a handover instruction, and transmits the handover instruction to the mobile terminal. After receiving the handover instruction, the mobile terminal is handed over to a cell indicated by the handover instruction.

After the low-priority identification card is determined, according to step S63, the reporting of the cell measurement value of the low-priority identification card for the interfered-with cell is stopped. In this case, the serving cell does not obtain the cell measurement value of the interfered-with cell, so that the low-priority identification card is not handed over to the interfered-with cell.

In addition, after the low-priority identification card is determined, a cell measurement value of the low-priority identification card for the interfered-with cell may be further decreased, and the decreased cell measurement value is reported. In this case, the low-priority identification card is not handed over to the interfered-with cell, either.

The cell measurement value may be a plurality of types of parameters. For example, in the 4G LTE protocol, the cell measurement value may be downlink signal receiving power (reference signal receiving power, RSRP) and/or downlink signal receiving quality (reference signal receiving quality, RSRQ). This is not limited in this embodiment of this application.

To further save card slot space, there is further an embedded SIM (Embedded-SIM, eSIM card) card currently, and the eSIM card may be directly embedded in a device chip. The eSIM card is much smaller than a nano-SIM card. This greatly saves the card slot space. In this case, this application provides another embodiment. In this embodiment, a network selection method applied to a mobile terminal is provided. In addition, in this embodiment, an identification card applied to the mobile terminal is an eSIM card. To be specific, there is a first eSIM card and a second eSIM card in the mobile terminal. The network selection method applied to the mobile terminal includes:

executing, by the mobile terminal, a communication service by using the first eSIM card;

determining that the communication service of the first eSIM card interferes with the second eSIM card; and adjusting cell reselection information of the second eSIM card, so that the second eSIM card reselects to a non-interfered-with cell.

According to the solution disclosed in the embodiments of this application, the communication service of the first eSIM card can be prevented from interfering with the second eSIM card, to resolve a prior-art problem.

In this embodiment of this application, steps provided in the foregoing embodiments may be still used when it is determined whether the communication service of the first eSIM card interferes with the second eSIM card and when the cell reselection information of the second eSIM card is adjusted, so that the second eSIM card reselects to the non-interfered-with cell.

When using a mobile terminal, sometimes, a user sets up communication services for two identification cards at the same time. For this application scenario, this application discloses the following embodiment.

An embodiment of this application discloses a network selection method applied to a mobile terminal. A first card slot and a second card slot are disposed in the mobile terminal. When the first card slot accommodates a first identification card and the second card slot accommodates a second identification card, referring to a schematic diagram of a working procedure shown in FIG. 8, the network selection method applied to the mobile terminal includes the following steps.

Step S71: The mobile terminal executes communication services by using the first identification card and the second identification card.

Step S72: Determine that the communication service of the first identification card interferes with the second identification card and the communication service of the second identification card interferes with the first identification card.

It is usually determined, based on a transmit frequency and a receive frequency of the first identification card and a transmit frequency and a receive frequency of the second identification card, whether the communication service of the first identification card interferes with the second identification card and whether the communication service of the second identification card interferes with the first identification card.

Step S73: Determine a priority of the first identification card and a priority of the second identification card based on the communication service of the first identification card and the communication service of the second identification card.

In this embodiment of this application, corresponding priorities are preset for different communication services. Usually, a priority of a voice communication service is higher than a priority of a data communication service. For example, if a first communication service is making a call, and a second communication service is accessing the internet, a priority of the first communication service is usually set to be higher than a priority of the second communication service.

In this case, the priorities of the second identification card and the first identification card may be determined based on the communication services executed by using the second identification card and the first identification card.

Step S74: Terminate a communication service of a low-priority identification card, and adjust cell reselection information of the low-priority identification card, so that the low-priority identification card reselects to a non-interfered-with cell.

According to step S74, the low-priority identification card can reselect to the non-interfered-with cell. In this case, a communication service of a high-priority identification card does not interfere with the low-priority identification card.

Further, after the low-priority identification card reselects to the non-interfered-with cell, the communication service of the low-priority identification card no longer interferes with the high-priority identification card.

Step S75: After the low-priority identification card reselects to the non-interfered-with cell, control the low-priority identification card to execute a corresponding communication service.

When the communication services are executed by using the first identification card and the second identification card in the mobile terminal at the same time and interfere with each other, the communication service of the low-priority identification card can be terminated through the operations in step S71 to step S75, so that the low-priority identification card reselects to the non-interfered-with cell. Therefore, the communication service of the high-priority identification card is prevented from interfering with the low-priority identification card, and then the low-priority identification card is controlled to set up the corresponding communication service.

According to the solution disclosed in this embodiment of this application, a communication service can be prevented from interfering with another identification card when different identification cards in the mobile terminal execute communication services, to resolve a prior-art problem.

In addition, after step S71, if it is determined that the communication service of the first identification card does not interfere with the second identification card and the communication service of the second identification card does not interfere with the first identification card, the corresponding communication services are executed by using the first identification card and the second identification card.

Alternatively, if it is determined, through the operation in step S71, that a communication service of one identification card interferes with the other identification card, but a communication service of the other identification card does not interfere with the identification card, the other identification card may reselect to a non-interfered-with cell, and the other identification card is controlled to execute a corresponding communication service.

Further, after the terminating a communication service of a low-priority identification card, and adjusting cell reselection information of the low-priority identification card, so that the low-priority identification card reselects to a non-interfered-with cell, the method may further include the following step:

stopping reporting a cell measurement value of the low-priority identification card for an interfered-with cell; and/or decreasing the cell measurement value of the low-priority identification card for the interfered-with cell, and reporting a decreased cell measurement value.

In this case, the low-priority identification card can be prevented from handing over to the interfered-with cell, to prevent a communication service of the high-priority identification card from interfering with the low-priority identification card.

To further save card slot space, there is further an embedded SIM (Embedded-SIM, eSIM card) card currently, and the eSIM card may be directly embedded in a device chip. The eSIM card is much smaller than a nano-SIM card. This greatly saves the card slot space. In this case, this application provides another embodiment. In this embodiment, a network selection method applied to a mobile terminal is provided. In addition, in this embodiment, an identification card applied to the mobile terminal is an eSIM card. To be specific, there is a first eSIM card and a second eSIM card in the mobile terminal. The network selection method applied to the mobile terminal includes:

executing, by the mobile terminal, communication services by using the first eSIM card and the second eSIM card;
determining that the communication service of the first eSIM card interferes with the second eSIM card and the communication service of the second eSIM card interferes with the first eSIM card;
determining a priority of the first eSIM card and a priority of the second eSIM card based on the communication service of the first eSIM card and the communication service of the eSIM card;
terminating a communication service of a low-priority eSIM card, and adjusting cell reselection information of the low-priority eSIM card, so that the low-priority eSIM card reselects to a non-interfered-with cell; and
after the low-priority eSIM card reselects to the non-interfered-with cell, controlling the low-priority eSIM card to execute a corresponding communication service.

According to the solution disclosed in this embodiment of this application, a communication service can be prevented from interfering with another eSIM card when different eSIM cards in the mobile terminal execute communication services, to resolve a prior-art problem.

In this embodiment of this application, steps provided in the foregoing embodiment may be still used when it is determined whether the communication service of the first eSIM card interferes with the second eSIM card and whether the communication service of the second eSIM card interferes with the first eSIM card, and when the cell reselection information of the low-priority eSIM card is adjusted, so that the low-priority eSIM card reselects to the non-interfered-with cell.

Figure 9:
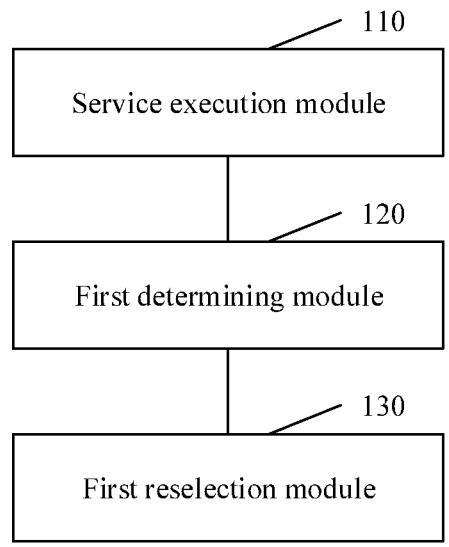
FIG. 9 is a schematic structural diagram of a network selection apparatus applied to a mobile terminal according to an embodiment of this application.

Correspondingly, another embodiment of this application discloses a network selection apparatus applied to a mobile terminal. A first card slot and a second card slot are disposed in the mobile terminal. When the first card slot accommodates a first identification card and the second card slot accommodates a second identification card, referring to a schematic structural diagram shown in FIG. 9, the network selection apparatus applied to the mobile terminal includes a service execution module 110, a first determining module 120, and a first reselection module 130.

The service execution module 110 is configured to execute a communication service by using the first identification card.

The first identification card may support a plurality of communications standards such as a GSM, CDMA, TDSCDMA, WCDMA, LTE, and NR. Correspondingly, the second identification card may support a plurality of communications standards such as a GSM, CDMA, TDSCDMA, WCDMA, LTE, and NR. In addition, the first identification card and the second identification card may support a same communications standard or different communications standards. This is not limited in this embodiment of this application.

The first determining module 120 is configured to determine that the communication service of the first identification card interferes with the second identification card.

When the communication service is executed by using the first identification card, a signal usually needs to be sent. The signal is usually an electromagnetic wave signal, which may interfere with the second identification card. Therefore, it is necessary to detect, by using the first determining module 120, whether the communication service of the first identification card interferes with the second identification card.

The first reselection module 130 is configured to adjust cell reselection information of the second identification card, so that the second identification card reselects to a non-interfered-with cell.

The cell reselection information includes a cell priority, a cell measurement value, and/or a reselection threshold. The non-interfered-with cell is a cell that is not interfered with by the communication service of the first identification card. To be specific, if the second identification card reselects to the non-interfered-with cell, the communication service of the first identification card does not interfere with the second identification card.

After an identification card in the mobile terminal accesses a serving cell, the mobile terminal can obtain a cell priority of the serving cell and a cell priority of a neighboring cell of the identification card. In addition, the cell priority of the serving cell and the cell priority of the neighboring cell may be further arranged through a priority list. The serving cell usually has a relatively high cell priority. In this embodiment of this application, the cell priority of the second identification card is adjusted, so that the second identification card can reselect to the non-interfered-with cell.

After the identification card in the mobile terminal accesses the serving cell, the mobile terminal measures cell measurement values of the serving cell and the neighboring cell of the identification card, and determines, based on the cell measurement values, whether cell reselection needs to be performed. In this embodiment of this application, the cell measurement value of the second identification card is adjusted, so that the second identification card can also reselect to the non-interfered-with cell.

In addition, to implement cell reselection, a corresponding reselection threshold is preset for each cell. When reselection information of the identification card in the mobile terminal in a cell is greater than the reselection threshold, the serving cell of the identification card usually reselects to the cell. In this embodiment of this application, the reselection threshold may be used as the cell reselection information. A reselection threshold of a serving cell of the second identification card is adjusted, so that the second identification card cannot access the current serving cell, but reselects to the non-interfered-with cell.

If it is determined that the communication service of the first identification card interferes with the second identification card, the cell reselection information of the second identification card needs to be adjusted, so that the second identification card reselects to the non-interfered-with cell. This operation may be implemented in a plurality of manners. Correspondingly, the first reselection module disclosed in this embodiment of this application includes a first priority adjustment unit, and/or a first measurement value adjustment unit, and/or a first threshold adjustment unit.

The first priority adjustment unit is configured to decrease a cell priority of a serving cell of the second identification card, and/or increase a cell priority of the non-interfered-with cell of the second identification card, so that the cell priority of the non-interfered-with cell of the second identification card is higher than the cell priority of the serving cell of the second identification card.

The first measurement value adjustment unit is configured to decrease a cell measurement value of the serving cell of the second identification card, and/or increase a cell measurement value of the non-interfered-with cell of the second identification card, so that the cell measurement value of the non-interfered-with cell of the second identification card is greater than the cell measurement value of the serving cell of the second identification card.

The first threshold adjustment unit is configured to increase a reselection threshold of the serving cell of the second identification card, so that the second identification card cannot access the serving cell.

According to the solution disclosed in the foregoing embodiment, when it is determined that the communication service of the first identification card interferes with the second identification card, the cell reselection information of the second identification card can be adjusted, so that the second identification card reselects to the non-interfered-with cell, and the second identification card implements interference avoidance network selection. In this way, the communication service of the first identification card is prevented from interfering with the second identification card.

In addition, after the communication service is executed by using the first identification card, in some cases, it may be determined that the communication service of the first identification card does not interfere with the second identification card. In this case, this application discloses another embodiment. The network selection apparatus applied to the mobile terminal disclosed in this embodiment further includes:

a second determining module, configured to: after the service execution module executes the communication service by using the first identification card, determine that the communication service of the first identification card does not interfere with the second identification card; and a second reselection module, configured to adjust the cell reselection information of the second identification card, to prevent the second identification card from reselecting to an interfered-with cell.

The second reselection module includes a second priority adjustment unit, and/or a second measurement value adjustment unit, and/or a second threshold adjustment unit.

The second priority adjustment unit is configured to increase a cell priority of a serving cell of the second identification card, and/or decrease a cell priority of the interfered-with cell of the second identification card.

The second measurement value adjustment unit is configured to increase a cell measurement value of the serving cell of the second identification card, and/or decrease a cell measurement value of the interfered-with cell of the second identification card.

The second threshold adjustment unit is configured to decrease a reselection threshold of the serving cell of the second identification card.

This embodiment of this application discloses the network selection apparatus applied to the mobile terminal. According to the solution disclosed in this embodiment of this application, the communication service of the first identification card can be prevented from interfering with the second identification card, to resolve a prior-art problem.

Figure 10:
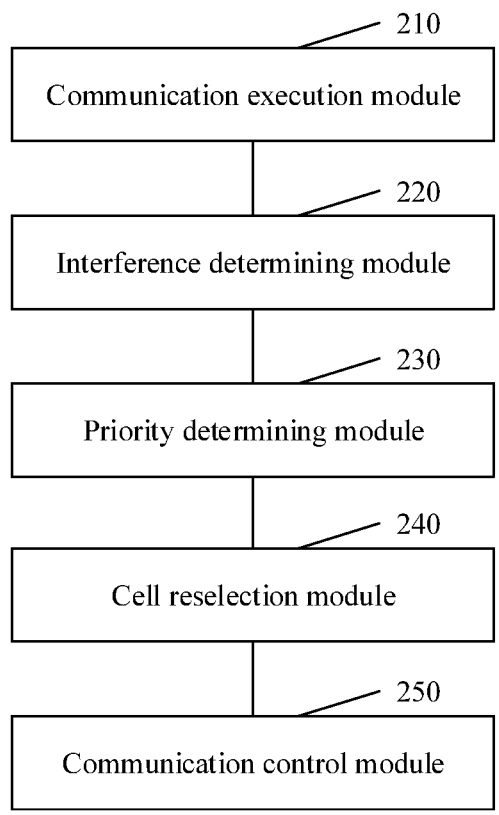
FIG. 10 is a schematic structural diagram of another network selection apparatus applied to a mobile terminal according to an embodiment of this application.

When using a mobile terminal, a user sometimes sets up communication services for two identification cards at the same time. For this application scenario, this application discloses a network selection apparatus applied to a mobile terminal. A first card slot and a second card slot are disposed in the mobile terminal. When the first card slot accommodates a first identification card and the second card slot accommodates a second identification card, referring to a schematic structural diagram shown in FIG. 10, the network selection apparatus applied to the mobile terminal includes a communication execution module 210, an interference determining module 220, a priority determining module 230, a cell reselection module 240, and a communication control module 250.

The communication execution module 210 is configured to execute communication services by using the first identification card and the second identification card.

The interference determining module 220 is configured to determine that the communication service of the first identification card interferes with the second identification card and the communication service of the second identification card interferes with the first identification card.

It is usually determined, based on a transmit frequency and a receive frequency of the first identification card and a transmit frequency and a receive frequency of the second identification card, whether the communication service of the first identification card interferes with the second identification card and whether the communication service of the second identification card interferes with the first identification card.

The priority determining module 230 is configured to determine a priority of the first identification card and a priority of the second identification card based on the communication service of the first identification card and the communication service of the second identification card.

In this embodiment of this application, corresponding priorities are preset for different communication services. Usually, a priority of a voice communication service is higher than a priority of a data communication service. For example, if a first communication service is making a call, and a second communication service is accessing the internet, a priority of the first communication service is usually set to be higher than a priority of the second communication service.

In this case, the priorities of the second identification card and the first identification card may be determined based on the communication services executed by using the second identification card and the first identification card.

The cell reselection module 240 is configured to terminate a communication service of a low-priority identification card, and adjust cell reselection information of the low-priority identification card, so that the low-priority identification card reselects to a non-interfered-with cell.

The communication control module 250 is configured to: after the low-priority identification card reselects to the non-interfered-with cell, control the low-priority identification card to execute a corresponding communication service.

According to the solution disclosed in this embodiment of this application, the communication service of the first identification card can be prevented from interfering with the second identification card, to resolve a prior-art problem.

Figure 11:
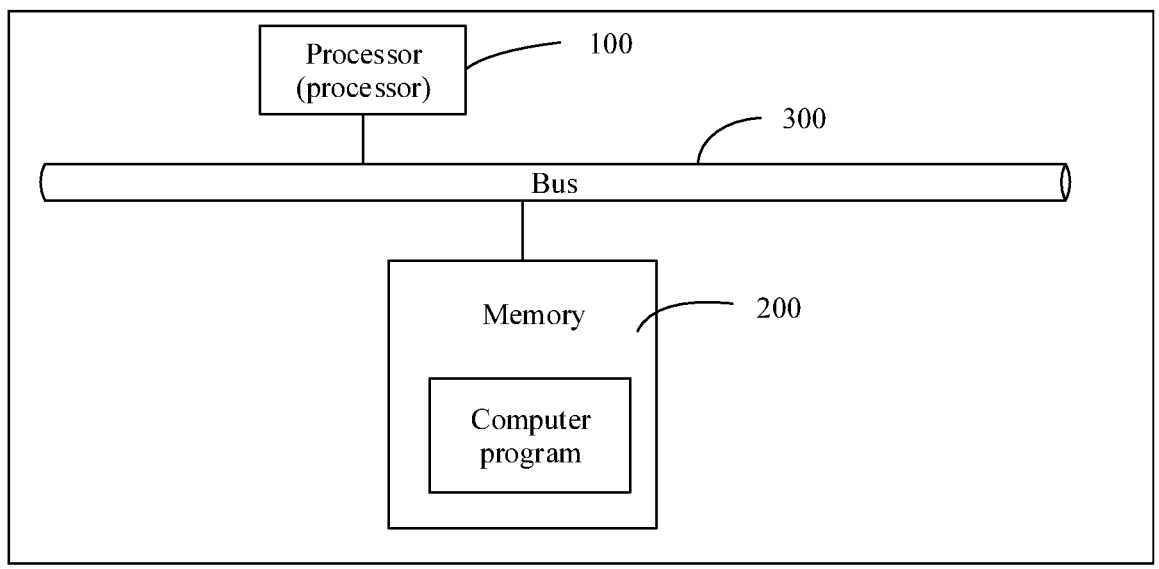
FIG. 11 is a schematic structural diagram of a mobile terminal according to an embodiment of this application.

FIG. 11 shows a mobile terminal involved in the foregoing embodiments. A first card slot and a second card slot are disposed in the mobile terminal. The first card slot is configured to accommodate a first identification card, and the second card slot is configured to accommodate a second identification card. The mobile terminal includes a memory 100, a processor 200, and a computer program that is stored in the memory and that can be run on the processor. When executing the computer program, the processor implements the network selection method applied to the mobile terminal shown in FIG. 1 to FIG. 2 and FIG. 4 to FIG. 7.

Further, the mobile terminal may further include a bus 300, and the memory 100 may include a random access memory, a read-only memory, and the like.

When the mobile terminal is to run, the mobile terminal is started by using a basic input/output system built in the memory or by using a bootloader boot system in an embedded system, to boot the mobile terminal to enter a normal running state. After the mobile terminal enters the normal running state, an application program and an operating system in the memory is run, so that the processor performs the following operations:

executing a communication service by using the first identification card;

determining that the communication service of the first identification card interferes with the second identification card; and adjusting cell reselection information of the second identification card, so that the second identification card reselects to a non-interfered-with cell.

The mobile terminal in this embodiment of the present invention may correspond to the mobile terminal in the embodiments corresponding to FIG. 1, FIG. 2, and FIG. 4 to FIG. 7. In addition, the mobile terminal may implement functions of the network device and/or various steps and methods implemented by the network device in the embodiments corresponding to FIG. 1, FIG. 2, and FIG. 4 to FIG. 7. For brevity, details are not described herein again.

A storage medium in any device may be a magnetic disk, an optical disc, a read-only memory (English: read-only memory, ROM for short), a random access memory (English: random access memory, RAM for short), or the like.

The processor may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory may include a volatile memory (volatile memory) such as a random access memory (random-access memory, RAM), or the memory may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory may include a combination of the foregoing types of memories.

It should be noted that in this embodiment, the network device may alternatively be implemented based on a general physical server with reference to a network functions virtualization (English: Network Function Virtualization, NFV) technology, and the network device is a virtual network device (for example, a virtual host, a virtual router, or a virtual switch). The virtual network device may be a virtual machine (English: Virtual Machine, VM), and the virtual machine is deployed on a hardware device (for example, a physical server). The virtual machine is a complete computer system simulated by software, having a complete hardware system function, and running in an isolated environment. After reading this application, a person skilled in the art may virtualize, on the general physical server, a plurality of network devices having the foregoing functions. Details are not described herein.

An embodiment of this application further discloses another mobile terminal. A first card slot and a second card slot are disposed in the mobile terminal. The first card slot is configured to accommodate a first identification card, and the second card slot is configured to accommodate a second identification card. The mobile terminal includes a memory, a processor, and a computer program that is stored in the memory and that can be run on the processor. When executing the computer program, the processor implements the network selection method applied to the mobile terminal shown in FIG. 8.

Further, the mobile terminal may further include a bus, and the memory may include a random access memory, a read-only memory, and the like.

When the mobile terminal is to run, the mobile terminal is started by using a basic input/output system built in the memory or by using a bootloader boot system in an embedded system, to boot the mobile terminal to enter a normal running state. After the mobile terminal enters the normal running state, an application program and an operating system in the memory is run, so that the processor performs the following operations:
- executing communication services by using the first identification card and the second identification card;
- determining that the communication service of the first identification card interferes with the second identification card and the communication service of the second identification card interferes with the first identification card;
- determining a priority of the first identification card and a priority of the second identification card based on the communication service of the first identification card and the communication service of the second identification card;
- terminating a communication service of a low-priority identification card, and adjusting cell reselection information of the low-priority identification card, so that the low-priority identification card reselects to a non-interfered-with cell; and
- after the low-priority identification card reselects to the non-interfered-with cell, controlling the low-priority identification card to execute a corresponding communication service.

Figure 8:
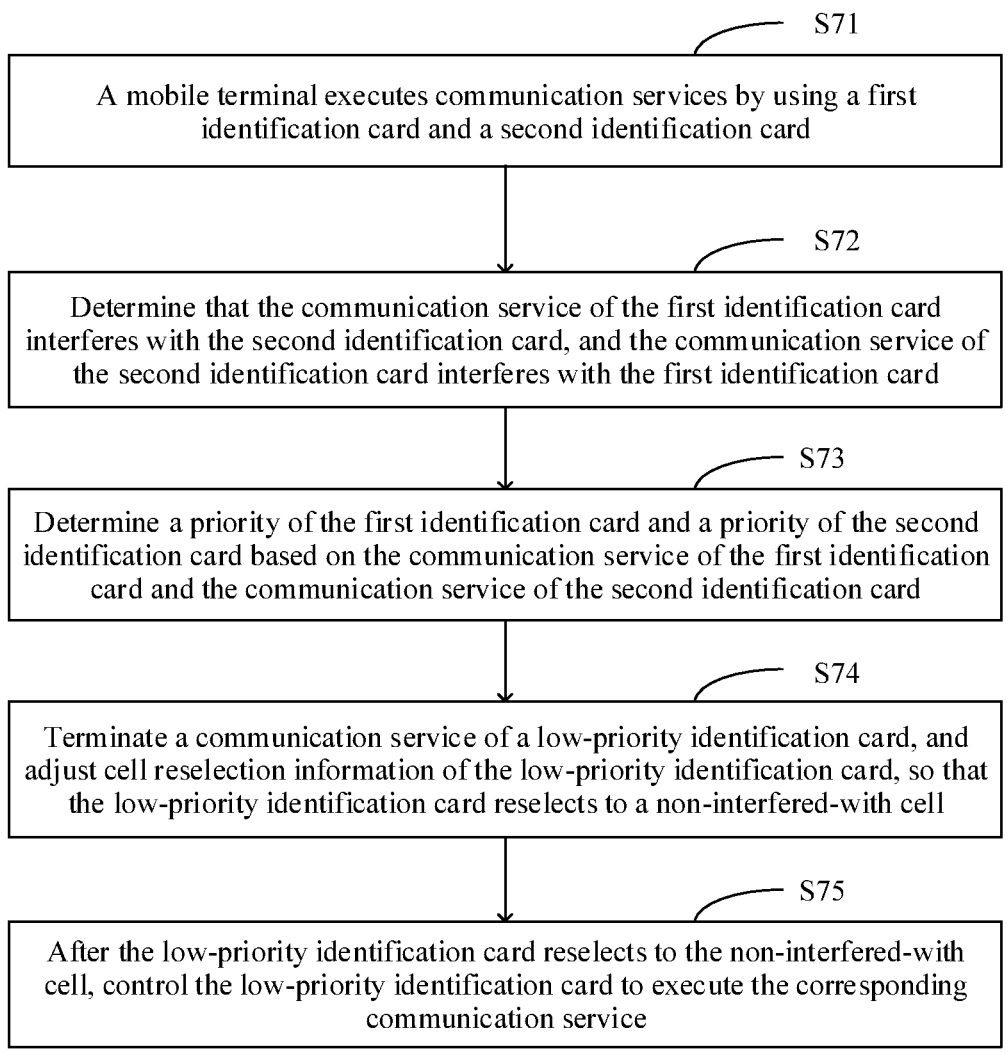
FIG. 8 is a schematic diagram of another working procedure of a network selection method applied to a mobile terminal according to an embodiment of this application.

The mobile terminal in this embodiment of the present invention may correspond to the mobile terminal in the embodiment corresponding to FIG. 8. In addition, the mobile terminal may implement functions of the network device and/or various steps and methods implemented by the network device in the embodiment corresponding to FIG. 8. For brevity, details are not described herein again.

It should be noted that in this embodiment, the network device may alternatively be implemented based on a general physical server with reference to a network functions virtualization (English: Network Function Virtualization, NFV) technology, and the network device is a virtual network device (for example, a virtual host, a virtual router, or a virtual switch). The virtual network device may be a virtual machine (English: Virtual Machine, VM), and the virtual machine is deployed on a hardware device (for example, a physical server). The virtual machine is a complete computer system simulated by software, having a complete hardware system function, and running in an isolated environment. After reading this application, a person skilled in the art may virtualize, on the general physical server, a plurality of network devices having the foregoing functions. Details are not described herein.

A storage medium in any device may be a magnetic disk, an optical disc, a read-only memory (English: read-only memory, ROM for short), a random access memory (English: random access memory, RAM for short), or the like.

The processor may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof. The memory may include a volatile memory (volatile memory) such as a random access memory (random-access memory, RAM), or the memory may include a non-volatile memory (non-volatile memory) such as a read-only memory (read-only memory, ROM), a flash memory (flash memory), a hard disk drive (hard disk drive, HDD), or a solid-state drive (solid-state drive, SSD), or the memory may include a combination of the foregoing types of memories.

In specific implementation, an embodiment of this application further provides a computer readable medium. The computer readable medium includes an instruction, and when the computer readable medium is run on a computer, the computer is enabled to implement some or all steps of the network selection method applied to the mobile terminal provided in FIG. 1, FIG. 2, and FIG. 4 to FIG. 7. A storage medium in any device may be a magnetic disk, an optical disc, a read-only memory (English: read-only memory, ROM for short), a random access memory (English: random access memory, RAM for short), or the like.

In specific implementation, an embodiment of this application further provides a computer readable medium. The computer readable medium includes an instruction, and when the computer readable medium is run on a computer, the computer is enabled to implement some or all steps of the network selection method applied to the mobile terminal provided in FIG. 8. A storage medium in any device may be a magnetic disk, an optical disc, a read-only memory (English: read-only memory, ROM for short), a random access memory (English: random access memory, RAM for short), or the like.

The embodiments of the present invention relate to a network selection method applied to a mobile terminal. The mobile terminal may include a terminal device capable of executing a communication service, such as a mobile phone and a smart watch. The mobile terminal performs some or all steps of the network selection method applied to the mobile terminal provided in FIG. 1, FIG. 2, and FIG. 4 to FIG. 7, and/or performs some or all steps of the network selection method applied to the mobile terminal provided in FIG. 8.

Figure 12:
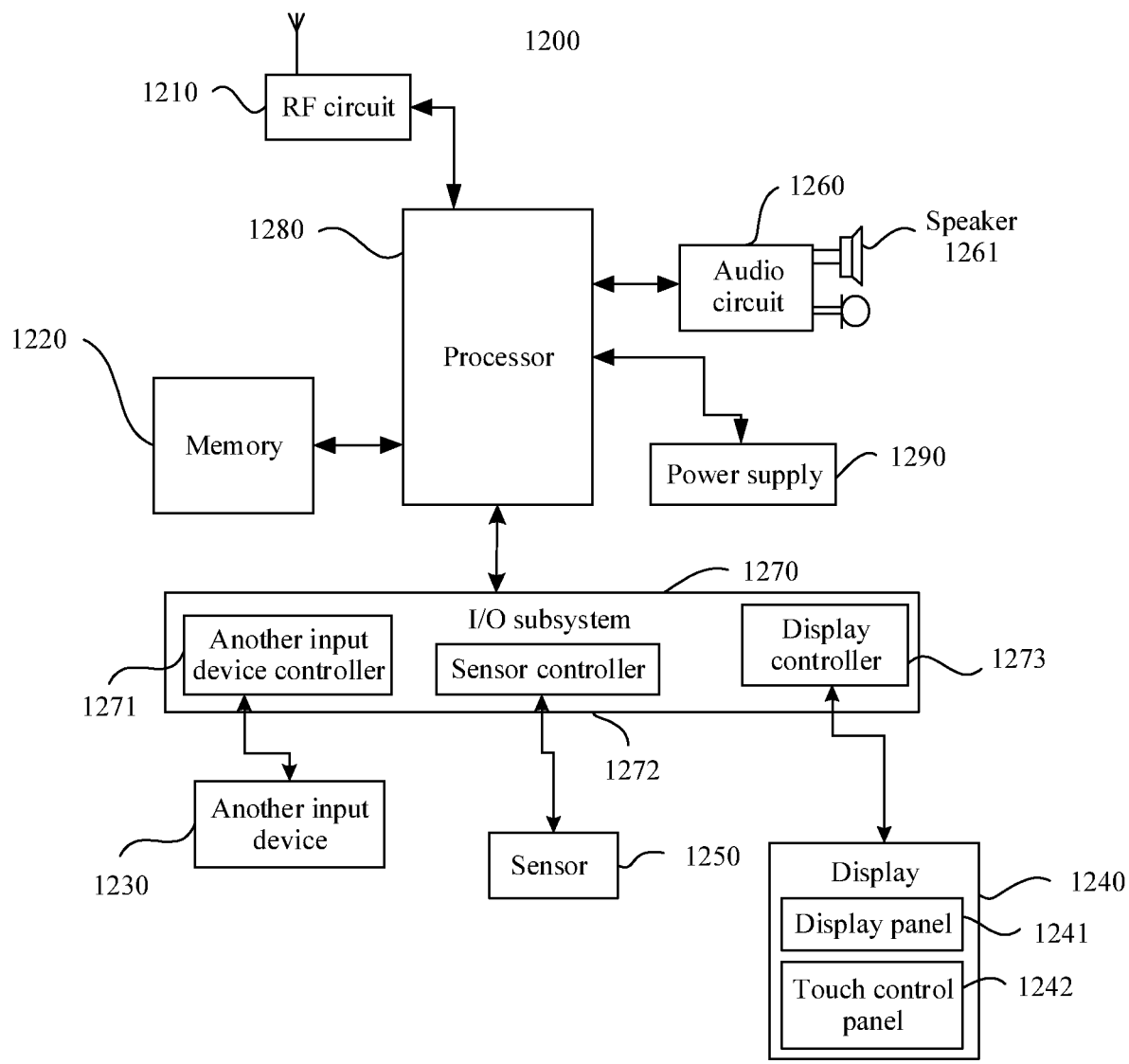
FIG. 12 is a schematic structural diagram of a mobile terminal according to an embodiment of this application.

For example, the mobile terminal is a mobile phone. FIG. 12 is a block diagram of a partial structure of a mobile phone 1200 related to the embodiments of the present invention. Referring to FIG. 12, the mobile phone 1200 includes components such as an RF (Radio Frequency, radio frequency) circuit 1210, a memory 1220, another input device 1230, a display 1240, a sensor 1250, an audio circuit 1260, an I/O subsystem 1270, a processor 1280, and a power supply 1290. A person skilled in the art may understand that a structure of the mobile phone shown in FIG. 12 does not constitute a limitation on the mobile phone. The mobile phone may include more or fewer components than those shown in the figure, or combine some components, or split some components, or have different component arrangements. A person skilled in the art may understand that, the display 1240 belongs to a user interface (User Interface, UI), and the mobile phone 1200 may include more or fewer user interfaces than those shown in the figure.

The following describes the components of the mobile phone 1200 in detail with reference to FIG. 12.

The RF circuit 1210 may be configured to receive and send information, or receive and send a signal during a call; in particular, send received downlink information of a base station to the processor 1280 for processing; and send related uplink data to the base station. The RF circuit usually includes but is not limited to an antenna, at least one amplifier, a transceiver, a coupler, an LNA (Low Noise Amplifier, low noise amplifier), a duplexer, and the like. In addition, the RF circuit 1210 may further communicate with a network and another device through wireless communication. The wireless communication may use any communications standard or protocol, including but not limited to a global system for mobile communications (Global System of Mobile communications, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Message Service, SMS), and the like.

The memory 1220 may be configured to store a software program and a module. The processor 1280 runs the software program and the module that are stored in the memory 1220, to implement various function applications and data processing of the mobile phone 1200. The memory 120 may mainly include a program storage area and a data storage area. The program storage area may store an operating system, an application program required by at least one function (such as an audio playback function and an image playback function), and the like. The data storage area may store data (such as audio data and a phone book) that is created based on use of the mobile phone 1200, and the like. In addition, the memory 1220 may include a high-speed random access memory, and may further include a non-volatile memory, such as at least one magnetic disk storage device, a flash memory device, or another volatile solid-state storage device.

The another input device 1230 may be configured to receive input digital or character information, and generate a key signal input related to user setting and function control of the mobile phone 1200. Specifically, the another input device 1230 may include but is not limited to one or more of the following: a physical keypad, a function button (for example, a volume control button or an on/off button), a trackball, a mouse, a joystick, an optical mouse (the optical mouse is a touch-sensitive surface that does not display a visual output, or is an extension of a touch-sensitive surface formed by a touchscreen), and the like. The another input device 1230 is connected to another input device controller 1271 of the I/O subsystem 1270, and perform signal exchange with the processor 1280 under control of the another input device controller 1271.

The display 1240 may be configured to display information entered by a user or information provided for the user, and various menus of the mobile phone 1200, and may further receive a user input. Specifically, the display 1240 may include a display panel 1241 and a touch panel 1242. The display panel 1241 may be configured in the form of an LCD (Liquid Crystal Display, liquid crystal display), an OLED (Organic Light-Emitting Diode, organic light-emitting diode), or the like. The touch panel 1242, also referred to as a touchscreen, a touch-sensitive screen, or the like, may collect a touch or non-touch operation (for example, an operation performed by the user on the touch panel 1242 or near the touch panel 1242 by using any proper object or accessory, such as a finger or a stylus, or may include a motion sensing operation, where the operation includes operation types such as a single-point control operation and a multipoint control operation) of the user on or near the touch panel 1242, and drive a corresponding connection apparatus according to a preset program. Optionally, the touch panel 1242 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that can be processed by the processor and then sends the information to the processor 1280, and can receive a command sent by the processor 1280 and execute the command. In addition, the touch panel 1242 may be implemented in a plurality of types, such as a resistive type, a capacitive type, an infrared ray, and a surface acoustic wave, or the touch panel 1242 may be implemented by using any technology developed in the future. Further, the touch panel 1242 may cover the display panel 1241. The user may perform, based on content displayed on the display panel 1241 (the displayed content includes but is not limited to a soft keyboard, a virtual mouse, a virtual key, an icon, and the like), an operation on or near the touch panel 1242 that covers the display panel 1241. After detecting the operation on or near the touch panel 1242, the touch panel 1241 sends the operation to the processor 1280 through the I/O subsystem 1270 to determine the user input. Then, the processor 1280 provides, based on the user input, a corresponding visual output on the display panel 341 by using the I/O subsystem 1270. Although, in FIG. 12, the touch panel 1242 and the display panel 1241 are used as two independent components to implement input and output functions of the mobile phone 1200, in some embodiments, the touch panel 1242 and the display panel 1241 may be integrated to implement the input and output functions of the mobile phone 1200.

The mobile phone 1200 may further include at least one sensor 1250, such as a light sensor, a motion sensor, and another sensor. Specifically, the light sensor may include an ambient light sensor and a proximity sensor. The ambient light sensor may adjust luminance of a display panel 1241 based on brightness of ambient light. The proximity sensor may power off the display panel 1241 and/or backlight when the mobile phone 1200 approaches an ear. As a type of movement sensor, an accelerometer sensor may detect a value of acceleration in each direction (usually on three axes), may detect a value and a direction of gravity in a stationary state, and may be used in an application for identifying a mobile phone posture (such as screen switching between a landscape mode and a portrait mode, a related game, or magnetometer posture calibration), a function related to vibration identification (such as a pedometer or a knock), or the like. Other sensors such as a gyroscope, a barometer, a hygrometer, a thermometer, or an infrared sensor may be further configured in the mobile phone 1200. Details are not described herein.

The audio circuit 1260, a speaker 1261, and a microphone 1262 may provide an audio interface between the user and the mobile phone 1200. The audio circuit 1260 may transmit, to the speaker 1261, a signal converted from received audio data, and the speaker 1261 converts the electrical signal into a sound signal for output. In addition, the microphone 1262 converts a collected sound signal into a signal. The audio circuit 1260 receives the signal, converts the signal into audio data, and then outputs the audio data to the RF circuit 1208, to send the audio data to, for example, another mobile phone, or outputs the audio data to the memory 1220 for further processing.

The I/O subsystem 1270 is configured to control an external input/output device, and may include another input device controller 1271, a sensor controller 1272, and a display controller 1273. Optionally, one or more another input control device controllers 1271 receive a signal from the another input device 1230 and/or send a signal to the another input device 1230. The another input device 1230 may include a physical button (a pressing button, a rocker button, and the like), a dial pad, a slider switch, a joystick, a click scroll wheel, or an optical mouse (the optical mouse is a touch-sensitive surface that does not display a visible output, or an extension of a touch-sensitive surface formed by a touchscreen). It should be noted that the another input device controller 1271 may be connected to any one or more of the foregoing devices. The display controller 1273 in the I/O subsystem 1270 receives a signal from the display 1240, and/or sends a signal to the display 1240. After the display 1240 detects the user input, the display controller 1273 converts the detected user input into interaction with a user interface object displayed on the display 1240. To be specific, man-machine interaction is implemented. The sensor controller 1272 may receive a signal from one or more sensors 1250, and/or send a signal to one or more sensors 1250.

The processor 1280 is a control center of the mobile phone 1200, is connected to all parts of the entire mobile phone by using various interfaces and lines, and executes various functions of the mobile phone 1200 and performs data processing by running or executing a software program and/or a module stored in the memory 1220 and by invoking data stored in the memory 1220, to perform overall monitoring on the mobile phone. Optionally, the processor 1280 may include one or more processing units. Preferably, the processor 1280 may integrate an application processor and a modem processor. The application processor mainly processes an operating system, a user interface, an application program, and the like. The modem processor mainly processes wireless communication. It may be understood that, the modem processor may not be integrated into the processor 1280.

The mobile phone 1200 further includes the power supply 1290 (such as a battery) that supplies power to each component. Preferably, the power supply may be logically connected to the processor 1280 through a power management system, to implement functions such as charging management, discharging management, and power consumption management by using the power management system.

Although not shown, the mobile phone 1200 may further include a camera, a Bluetooth module, and the like. Details are not described herein.

A person skilled in the art may further understand that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it does not need to be considered that the implementation goes beyond the scope of the embodiments of this application.

The various illustrative logical units and circuits described in the embodiments of this application may implement or operate the described functions through a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may further be integrated into a processor. The processor and the storage medium may be arranged in an ASIC, and the ASIC may be arranged in UE. Optionally, the processor and the storage medium may be arranged in different components of the UE.

It should be understood that sequence numbers of the foregoing processes do not mean execution sequences in various embodiments of this application. The execution sequences of the processes need to be determined based on functions and internal logic of the processes, and should not be construed as any limitation on the implementation processes of the embodiments of this application.

All or some of the foregoing embodiments may be implemented through software, hardware, firmware, or any combination thereof. When software is used to implement the embodiments, the embodiments may be implemented completely or partially in the form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from one computer readable storage medium to another computer readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The embodiments in this specification are all described in a progressive manner, for same or similar parts in the embodiments, refer to these embodiments, and each embodiment focuses on a difference from other embodiments.

Especially, apparatus and system embodiments are basically similar to a method embodiment, and therefore are described briefly. For related parts, refer to partial descriptions in the method embodiment.

Although preferred embodiments of this application have been described, once learning of the basic inventive concept, a person skilled in the art can make additional changes and modifications to these embodiments. Therefore, the following claims are intended to be construed as to cover the preferred embodiments and all changes and modifications falling within the scope of this application.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The computer software product may be stored in a storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments of the present invention.

For same or similar parts in the embodiments in this specification, refer to each other. Especially, the . . . embodiment is basically similar to a method embodiment, and therefore is described briefly. For related parts, refer to descriptions in the method embodiment.

The foregoing descriptions are implementations of the present invention, but are not intended to limit the protection scope of the present invention.

What is claimed is:

1. A network selection method, comprising:
    executing a first communication service using a first identification card inserted in a first card slot of mobile terminal;
    determining that the first communication service interferes with a second identification card inserted in a second card slot of the mobile terminal by:
        determining that a first difference between a first product of a transmit frequency of the first identification card and a first positive integer (M) and a receive frequency of the second identification card is within a first preset range; or
        determining that a second difference between a second product of the receive frequency and a second positive integer (N) and the transmit frequency is within a second preset range;
    adjusting cell reselection information of the second identification card to generate adjusted cell reselection information; and
    reselecting, using the second identification card, to a non-interfered-with cell based on the adjusted cell reselection information.

2. The network selection method of claim 1, further comprising determining that a first cell identifier of a first serving cell of the first identification card is different than a second cell identifier of a second serving cell of the second identification card.

3. The network selection method of claim 1, further comprising:
    decreasing a first cell priority of a serving cell of the second identification card or increasing a second cell priority of the non-interfered-with cell, wherein the second cell priority is higher than the first cell priority;
    decreasing a first cell measurement value of the serving cell or increasing a second cell measurement value of the non-interfered-with cell, wherein the second cell measurement value is greater than the first cell measurement value; and
    increasing a reselection threshold of the serving cell to make the second identification card unable to access the serving cell.

4. The network selection method of claim 1, wherein after executing the first communication service, the network selection method further comprises:
    determining that the first communication service does not interfere with the second identification card; and
    adjusting the cell reselection information to prevent the second identification card from reselecting an interfered-with cell.

5. The network selection method of claim 4, further comprising:
    increasing a first cell priority of a serving cell of the second identification card or decreasing a second cell priority of the interfered-with cell;
    increasing a first cell measurement value of the serving cell or decreasing a second cell measurement value of the interfered-with cell; or
    decreasing a reselection threshold of the serving cell.

6. The network selection method of claim 4, wherein after determining that the first communication service does not interfere with the second identification card or after adjusting the cell reselection information, the network selection method further comprises:
    executing a second communication service using the second identification card;
    comparing a first priority of the first identification card with a second priority of the second identification card based on the first communication service and the second communication service; and
    either: stopping reporting a cell measurement value of a low-priority identification card for the interfered-with cell or decreasing the cell measurement value for the interfered-with cell, and reporting a decreased cell measurement value.

7. The network selection method of claim 1, further comprising decreasing a first cell priority of a serving cell of the second identification card or increasing a second cell priority of the non-interfered-with cell, wherein the second cell priority is higher than the first cell priority.

8. The network selection method of claim 1, further comprising decreasing a first cell measurement value of a serving cell of the second identification card or increasing a second cell measurement value of the non-interfered-with cell, wherein the second cell measurement value is greater than the first cell measurement value.

9. The network selection method of claim 1, further comprising increasing a reselection threshold of a serving cell of the second identification card to make the second identification card unable to access the serving cell.

10. A mobile terminal, comprising:
    a first card slot;
    a second card slot;
    a first identification card inserted in the first card slot;
    a second identification card inserted in the second card slot;
    a memory configured to store instructions; and
    a processor coupled to the memory, the first card slot, and the second card slot, wherein the instructions cause the processor to be configured to:

execute a communication service using the first identification card;
determine that the communication service interferes with the second identification card by:
  determining that a first difference between a first product of a transmit frequency of the first identification card and a first positive integer (M) and a receive frequency of the second identification card is within a first preset range; or
  determining that a second difference between a second product of the receive frequency and a second positive integer (N) and the transmit frequency is within a second preset range;
adjust cell reselection information of the second identification card to generate adjusted cell reselection information; and
reselect, using the second identification card, to a non-interfered-with cell based on the adjusted cell reselection information.

11. The mobile terminal of claim 10, wherein the instructions further cause the processor to be configured to:
decrease a first cell priority of a serving cell of the second identification card or increase a second cell priority of the non-interfered-with cell of the second identification card, wherein the second cell priority is higher than the first cell priority;
decrease a first cell measurement value of the serving cell or increase a second cell measurement value of the non-interfered-with cell, wherein the second cell measurement value is greater than the first cell measurement value; or
increase a reselection threshold of the serving cell to make the second identification card unable to access the serving cell.

12. The mobile terminal of claim 10, wherein the instructions further cause the processor to be configured to:
determine that the communication service does not interfere with the second identification card after executing the communication service; and
adjust the cell reselection information to prevent the second identification card from reselecting an interfered-with cell.

13. The mobile terminal claim 12, wherein the instructions further cause the processor to be configured to:
increase a first cell priority of a serving cell of the second identification card or decrease a second cell priority of the interfered-with cell;
increase a first cell measurement value of the serving cell or decrease a second cell measurement value of the interfered-with cell; or
decrease a reselection threshold of the serving cell.

14. A network selection method implemented by a mobile terminal, wherein the network selection method comprises:
executing a first communication service using a first identification card inserted in a first card slot of the mobile terminal;
determining that the first communication service interferes with a second identification card inserted in a second card slot of the mobile terminal by:
  determining that a first cell identifier of a first serving cell of the first identification card is different than a second cell identifier of a second serving cell of the second identification card; and
  determining that a first difference between a first product of a transmit frequency of the first identification card and a first positive integer (M) and a receive frequency of the second identification card is within a first preset range;
adjusting cell reselection information of the second identification card to generate adjusted cell reselection information; and
reselecting, using the second identification card, to a non-interfered-with cell based on the adjusted cell reselection information.

15. The network selection method of claim 14, wherein after executing the first communication service, the network selection method further comprises:
determining that the first communication service does not interfere with the second identification card; and
adjusting the cell reselection information to prevent the second identification card from reselecting an interfered-with cell.

16. The network selection method of claim 15, further comprising:
increasing a first cell priority of a serving cell of the second identification card or decreasing a second cell priority of the interfered-with cell;
increasing a first cell measurement value of the serving cell or decreasing a second cell measurement value of the interfered-with cell; or
decreasing a reselection threshold of the serving cell.

17. The network selection method of claim 15, wherein after determining that the first communication service does not interfere with the second identification card or after adjusting the cell reselection information, the network selection method further comprises:
executing a second communication service using the second identification card;
comparing a first priority of the first identification card with a second priority of the second identification card based on the first communication service and the second communication service; and
either: stopping reporting a cell measurement value of a low-priority identification card for the interfered-with cell or decreasing the cell measurement value for the interfered-with cell, and reporting a decreased cell measurement value.

18. The network selection method of claim 14, further comprising decreasing a first cell priority of a serving cell of the second identification card or increasing a second cell priority of the non-interfered-with cell, wherein the second cell priority is higher than the first cell priority.

19. The network selection method of claim 14, further comprising decreasing a first cell measurement value of a serving cell of the second identification card or increasing a second cell measurement value of the non-interfered-with cell, wherein the second cell measurement value is greater than the first cell measurement value.

20. The network selection method of claim 14, further comprising increasing a reselection threshold of a serving cell of the second identification card to make the second identification card unable to access the serving cell.

* * * * *